US006538410B2

(12) United States Patent
Mori et al.

(10) Patent No.: US 6,538,410 B2
(45) Date of Patent: Mar. 25, 2003

(54) LEGGED MOBILE ROBOT AND EXTERNAL MODULE FOR THE ROBOT

(75) Inventors: Naoto Mori, Tokyo (JP); Satoru Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/746,672

(22) Filed: Dec. 22, 2000

(65) Prior Publication Data

US 2001/0030523 A1 Oct. 18, 2001

(30) Foreign Application Priority Data

Dec. 24, 1999 (JP) ............................................ 11-366175
Mar. 29, 2000 (JP) ........................................ 2000-091628

(51) Int. Cl.$^7$ ................................................. B25J 5/00
(52) U.S. Cl. .............................. 318/568.12; 318/568.11; 318/561; 901/8; 901/11; 901/1
(58) Field of Search ....................... 318/568.12, 568.11, 318/561; 446/355; 901/1, 8, 11

(56) References Cited

U.S. PATENT DOCUMENTS

| 4,584,625 A |   | 4/1986  | Kellogg                    |
|-------------|---|---------|----------------------------|
| 5,151,859 A | * | 9/1992  | Yoshino et al. ...... 901/1 |
| 5,158,493 A | * | 10/1992 | Morgrey .............. 446/355 |
| 5,421,426 A |   | 6/1995  | De Beaucourt et al.        |
| 5,426,586 A | * | 6/1995  | Ozawa ................. 901/33 |
| 5,893,296 A | * | 4/1999  | Rosheim ............... 901/9 |
| 6,289,265 B1 | * | 9/2001  | Takenaka et al. ..... 700/245 |
| 6,323,615 B1 | * | 11/2001 | Khairallah ........... 318/568.11 |

FOREIGN PATENT DOCUMENTS

| EP | 0 488 692 | 6/1992 |
| EP | 0 596 797 | 5/1994 |

* cited by examiner

Primary Examiner—Karen Masih
(74) Attorney, Agent, or Firm—Frommer Lawrence & Haug LLP; William S. Frommer

(57) ABSTRACT

A legged mobile robot in which sensors which can measure contact pressure are provided so as to be distributed at corresponding portions of whole body of the robot in order to determine the state of contact with the external world. In addition, modules which use shock-absorbing members for reducing shock are provided at the corresponding portions of the whole body of the robot. These modules cover their corresponding portions of the robot in order to further function as external parts for protecting the robot from shock. The modules can be constructed so as to be removable from the body of the robot, and may include batteries for supplying electrical power to terminal parts such as sensors. The invention provides a robot which can operate while being subjected to external forces as a result of coming into contact with an obstacle or other external objects, and which makes it possible to reduce shock which is produced when the robot comes into contact with an external object.

30 Claims, 17 Drawing Sheets 100
(FRONT)

100 (FRONT)

LEGGED MOBILE ROBOT AND EXTERNAL MODULE FOR THE ROBOT

BACKGROUND OF THE INVENTION

1. Field of the Invention

The present invention relates to a realistic robot which is constructed as a result of modeling the operation and mechanism of a living body, and, more particularly, to a legged mobile robot in which the mechanism of the body of a legged mobile animal, such as a human being and a monkey, is modeled.

Even more particularly, the present invention relates to a legged mobile robot which can operate independently or semi-independently while being subjected to various external forces in the living space/living environment of human beings. Still more particularly, the present invention relates to a legged mobile robot which can operate while being subjected to an external force as a result of coming into contact with an obstacle or other external objects, and which makes it possible to reduce shock which is produced when it comes into contact with an external object.

2. Description of the Related Art

A robot is a mechanical device which moves by emulating the movement of a human being by making use of electrical and magnetic actions. The term robot is said to be derived from the Slavic word ROBOTA (slavish machine). In our country, the widespread use of robots began from the end of the 1960s, many of which were industrial robots, such as manipulators and conveyance robots, used, for example, for the purpose of achieving automatic production operations in factories without humans in attendance.

Stationary robots, such as arm robots, which are implanted at certain places carry out, for example, parts assembly/sorting operations only at fixed/local working spaces. In contrast, the working space of movable robots is not limited. The robots move along a predetermined path or a pathless place in order to perform predetermined or any human tasks in place of human beings or to provide a wide variety of other services in place of human beings, dogs, or other living beings. Of the movable robots, legged mobile robots, though being unstable compared to crawler and tire type robots so that their postures and walking are difficult to control, are excellent robots in that they can go up and down steps and ladders, go over obstacles, and flexibly walk/run on any surface, regardless of whether the surface is a leveled or an unleveled surface.

In recent years, progress has been made in the research and development of legged mobile robots, such as pet robots which emulate the movements and mechanisms of the body of animals, such as dogs and cats, which walk on four feet, and humanoid robots which are designed as a result of modeling the movements and mechanisms of the body of animals, such as human beings, which walk erect on two feet. Accordingly, there is a higher expectation of putting them into practical use.

The significance of carrying out research and development of one type of legged mobile robots called humanoid robots can be understood from, for example, the following two viewpoints.

The first viewpoint is related to human science. More specifically, through the process of making a robot having a structure which is similar to a structure having lower limbs and/or upper limbs of human beings, thinking up a method of the same, and simulating the walking of a human being, the mechanism of the natural movement of a human being, such as walking, can be ergonomically understood. The results of such research can considerably contribute to the development of various other research fields which treat human movement mechanisms, such as ergonomics, rehabilitation engineering, and sports science.

The other viewpoint is related to the development of practical robots as partners of human beings which help them in life, that is, help them in various human activities in living environments and in various circumstances in everyday life. Functionally, in various aspects of the living environment of human beings, these robots need to be further developed by learning methods of adapting to environments and acting in accordance with human beings which have different personalities and characters while they are taught by human beings. Here, it is believed that making the form and structure of the robot the same as those of a human being is effective for smooth communication between human beings and robots.

For example, when teaching a robot a way of passing through a room while avoiding obstacles which should not be stepped on, it is much easier for the user (worker) to teach it to a robot walking on two feet which has the same form as the user than to a crawler-type or a four-footed robot having a completely different structure from the user. In this case, it must also be easier for the robot to learn it. (Refer to, for example, Controlling a Robot Which Walks On Two Feet" by Takanishi (Jidosha Gijutsukai Kanto Shibu <Koso> No. 25, April, 1996.)

Most of the working space and living space of human beings are formed in accordance with the behavioral mode and the body mechanism of a human being which walks erect on two feet. In other words, for moving present mechanical systems using wheels or other such driving devices as moving means, the living space of human beings has too many obstacles. It is preferable that the movable range of the robot be about the same as that of human beings in order for the mechanical system, that is, the robot to carry out various human tasks to help them or in place of them, and to deeply penetrate the living space of human beings. This is the reason why there is a great expectation of putting the legged mobile robot into practical use. In order to enhance the affinity of the robot to the living environment of human beings, it is essential for the robot to possess a human form.

Humanoid robots can be used to carry out various operations, such as in industrial activities/production work, in place of human beings. They carry out in place of human beings dangerous/difficult operations at places where human beings cannot enter easily. Examples of the dangerous/difficult operations include maintenance work at nuclear power plants, thermal power plants, or petrochemical plants, parts transportation/assembly operations in manufacturing plants, cleaning in tall buildings, and rescuing of people at, for example, places where there is a fire.

Another application of the humanoid robot is related to the living together in the same living space as human beings, that is, to entertainment. In this type of application, the robot is deeply characterized as being closely connected to life rather than as helping human beings in life by, for example, performing tasks in place of them.

For entertainment robots, the production of an operation pattern, itself, which is executed during the operation is a theme regarding the research and development thereof rather than the constructing of them so that they can be industrially used as specified with high speed and high precision. In other words, it is preferable that the whole body harmoniously moving type operation mechanism which animals, such as human beings and monkeys, which walk erect on two feet actually possess be faithfully reproduced in order to achieve smooth and natural movement. In addition, in emulating highly intelligent animals, such as human beings and monkeys, which stand in an upright posture, it is to be considered that the use of an operation pattern which uses the four limbs is natural as a living body, and it is desirable that the movements are sufficiently indicative of emotions and feelings.

Entertainment robots are required not only to faithfully execute a previously input operation pattern, but also to act in a lively manner in response to the words and actions of a person (such as speaking highly of someone, scolding someone, or hitting someone). In this sense, entertainment robots which emulate human beings are rightly called humanoid robots.

When humanoid robots which walk on two feet are formed to operate in a working space, they are constructed so as to possess many more degrees of freedom than other portable robots, such as crawler-type robots and robots which walk on four feet. Therefore, various portions of the surface of the robot come into contact with the external world, depending on the posture of the robot, such as standing upright on two feet while not moving, lying on its side, and sitting on a chair. In other words, there may be cases where the state of contact of the humanoid robot with the external world need to be determined in detail in various working circumstances. In addition, it is necessary to reduce shock which is produced when the robot loses its balance and falls down even though a controlling operation is carried out or when the robot comes into contact with an obstacle or other external objects.

Regarding robots in which sensors for measuring externally exerted contact pressures and shock are installed, various proposals have been made, and research and development has been conducted. However, a conventional on/off type contact sensor does not provide the precise contact pressure, so that, when, for example, the robot comes into contact with something soft, one cannot exactly know what portion of the robot has come into contact with the soft object. On the other hand, when the robot comes into contact with something hard, one cannot precisely know with what force the robot is in contact with the hard object from only a piece of information from the on/off type contact sensor.

A conventional independent contact pressure sensor only outputs information regarding the contact pressure, so that it cannot provide information regarding the area of contact of each portion of the body of the robot.

Sensor modules which are constructed so as to incorporate only the conventional contact pressure measuring function cannot reduce a strong shock which the robot receives when it falls down or collides with an external object. This affects the output from the sensor, and causes the controlling operation of the robot to become less stable.

When the sensor modules which are disposed so as to be distributed at corresponding portions of the whole body of the robot are fixedly mounted so that they cannot be removed, it becomes difficult to access the internal mechanisms of the sensor modules, thereby reducing maintainability of the robot.

Most of the sensor parts which are disposed so as to be distributed at the corresponding portions of the whole body of the robot are sensors of the type which electrically detect very weak signals. When a power supply for supplying electrical power to such sensors is also used for joint actuators and a controlling unit for controlling the actuation of the actuators, power supply noise which is produced when, for example, the operations start or stop may prevent the detection of accurate sensor information.

When the power supply which is used for the sensors is used for other electrical/electronic parts, it is necessary to use a circuit which includes parts, such as inductors and capacitors, for reducing noise. Therefore, the control device of the robot is increased in size, making it difficult to design it and increasing production costs.

In the first place, in order to sufficiently and effectively realize the functions of the sensors for detecting the state of the external world, the number of locations where the sensors are mounted is considerably limited (for example, for a legged mobile robot which includes four limbs, the mounting locations are the finger tips and the tips of the toes). Therefore, when an electrical power system is constructed by using a single power supply, the total lengths of the electrical power lines which are connected to the sensor modules become long, so that they are affected by noise more easily. In addition, in correspondence with the increased wiring lengths, the wiring design becomes complicated, and the complicated wiring design may restrict the structure of the whole robot.

For example, by forming the sensor modules into battery actuation type modules, and separating them from the power supply which is provided for the other electrical/electronic parts, the problem of noise will be overcome. However, since the forms of conventional cells which are generally used are limited, the robot is subjected to many limitations, so that, for example, the structure or shape, or the external design must be changed.

Hitherto, batteries/cells have been mainly cylindrical in shape. Therefore, when a battery pack comprising a plurality of batteries/cells are used, it becomes difficult to achieve a thin, light structure. Consequently, it inevitably becomes a thick structure, such as a rectangular parallelepiped structure. As a result, depending on where the battery pack is disposed, the whole robot loses its balance in terms of its weight, so that it may be difficult to carry out a posture control operation.

SUMMARY OF THE INVENTION

Accordingly, it is an object of the present invention to provide an excellent legged mobile robot which can operate while being subjected to various external forces in the living space/living environment of human beings.

It is another object of the present invention to provide an excellent legged mobile robot which can independently or semi-independently operate while being subjected to external forces as a result of coming into contact with an obstacle or other external objects, and which makes it possible to reduce shock which is produced when the robot comes into contact with an external object.

It is still another object of the present invention to provide an excellent legged mobile robot which includes sensors which are disposed so as to be distributed at corresponding portions of the robot in order to detect the state of the external world.

It is still another object of the present invention to provide an excellent legged mobile robot which makes it possible to suitably supply electrical power to the sensors which are disposed so as to be distributed at the corresponding portions of the robot in order to detect the state of the external world, and to obtain accurate sensor outputs without being affected by noise.

To these ends, according to a first aspect of the present invention, there is provided a legged mobile robot including at least lower limbs and a trunk. The robot comprises an external module which is provided at at least one portion of the robot so as to be removably mounted thereto, the external module/each external module including a sensor for measuring contact pressure.

The external module may be removably mounted to a head of the legged mobile robot.

The external module may be removably mounted to a front portion or a back portion of the trunk of the legged mobile robot, or the external modules may be removably mounted to the front portion and the back portion of the trunk of the legged mobile robot. The trunk of the legged mobile robot may be divided into a trunk front portion, a trunk back portion, a trunk left side portion, and a trunk right side portion in order to construct the external modules so as to be removable from these divided portions.

The external module may be removably mounted to a shoulder of the legged mobile robot.

The external module may be removably mounted to an outer portion or an inner portion of an upper arm of the legged mobile robot, or the external modules may be removably mounted to the outer portion and the inner portion of the upper arm of the legged mobile robot.

The external module may be removably mounted to an outer portion or an inner portion of a forearm of the legged mobile robot, or the external modules may be removably mounted to the outer portion and the inner portion of the forearm of the legged mobile robot.

The external module may be removably mounted to a front portion or a back portion of a thigh of the legged mobile robot, or the external modules may be removably mounted to the front portion and the back portion of the thigh of the legged mobile robot.

The external module may be removably mounted to a front portion or a back portion of a crus of the legged mobile robot, or the external modules may be removably mounted to the front portion and the back portion of the crus of the legged mobile robot.

The external module may be removably mounted to buttocks of the legged mobile robot.

The external modules may be removably mounted to left and right hands of the legged mobile robot.

The external module/each external module may comprise engaging means for engagement with a corresponding portion of the legged mobile robot.

The external module/each external module may comprise a base layer for preserving the shape of the module corresponding thereto, a sensor layer for detecting contact pressure which is externally applied, and a shock-absorbing layer for transmitting to the sensor layer corresponding thereto shock or contact pressure which is externally applied.

The sensor layer/each sensor layer may comprise a plurality of sensors which are disposed so as to be distributed on the base layer corresponding thereto.

The sensor layer/each sensor layer may comprise a sheet-shaped pressure sensor which is laid on the base layer corresponding thereto.

The external module/each external module may include a circuit layer comprising a printed wiring board having a predetermined wiring pattern thereon. The circuit layer/each circuit layer may have mounted thereto circuit components including an AD converter for converting a sensor output from the corresponding sensor layer to a corresponding digital signal and a microprocessor for processing the corresponding converted digital signal.

When the external module/each external module comprises a base layer, a sensor layer, and a shock-absorbing layer, the legged mobile robot may further comprise a contact determining section for controlling in a centralized manner information regarding the contact pressure which is externally supplied, based on the sensor output from the external module/each external module. The contact determining section is, for example, installed at a central control system (not shown) for executing a general controlling operation of the movement of the whole body of the legged mobile robot.

At present, the contact determining section is capable of controlling in a centralized manner what amount of contact pressure is being applied to what location of the robot, and of estimating, for example, the volume, the mass, the hardness, and the material of the object with which the robot is in contact as a result of analyzing the contact pressure data at each portion, so that the object itself can be specified.

According to a second aspect of the present invention, there is provided a legged mobile robot including at least lower limbs and a trunk. The robot comprises an actuating section for realizing movement of the lower limbs and/or the trunk, the actuating section being operable by electrical power, a computing/controlling section for controlling the operation of the actuating section, the computing/controlling section being operable by electrical power, a first power supply section for supplying electrical power to the actuating section and/or the computing/controlling section, and an external module which is provided at at least one portion of the robot so as to be removably mounted thereto, the external module/each external module including a second power supply section.

A sensor for measuring contact pressure or the like may be provided at at least one portion of the robot. In this case, by supplying electrical power to the sensor/each sensor from the corresponding second power supply, it is possible to eliminate the effects of noise which is produced at the first power supply section.

The external module/each external module may include engaging means for engagement with a corresponding portion of the legged mobile robot.

The external module/each external module may further include a base layer for preserving the shape of the corresponding module, an electrical power layer having the corresponding second power supply section installed therein, and a covering layer for externally covering the corresponding electrical power layer.

When the external module/each external module comprises a base layer, an electrical power layer, and a covering layer, the second power supply section/each second power supply section may be a removable battery pack, and the base layer/each base layer may include a terminal for electrical coupling with the corresponding battery pack.

The second power supply section/each second power supply section may be a removable battery pack. In this case, the base layer/each base layer may have a terminal for electrical coupling with the corresponding battery pack disposed thereon.

The second power supply section/each second power supply section may be a secondary battery which is chargeable and reusable. The battery is, for example, a lithium ion polymer secondary battery which uses gel polymer electrolyte.

According to a third aspect of the present invention, there is provided an external module for a robot which is removably mounted to the robot. The external module comprises a base layer for preserving the shape of the module, a sensor layer for detecting contact pressure which is externally applied, a shock-absorbing layer for transmitting to the sensor layer shock or contact pressure which is externally applied, and engaging means for engagement with an appropriate portion of the robot.

In a first form of the third aspect, the sensor layer comprises a plurality of sensors which are disposed so as to be distributed on the base layer.

In a second form of the third aspect, the sensor layer comprises a sheet-shaped pressure sensor which is laid on the base layer.

In a third form of the third aspect, the external module may include a circuit layer comprising a printed wiring board having a predetermined wiring pattern thereon. The circuit layer may have mounted thereto circuit components including an AD converter for converting a sensor output from the sensor layer to a digital signal and a microprocessor for processing the converted digital signal.

According to a fourth aspect of the present invention, there is provided an external module for a robot which is removably mounted to the robot. The external module comprises a base layer for preserving the shape of the module, an electrical power layer having a power supply section for supplying electrical power installed therein, a covering layer for externally covering the electrical power layer, and engaging means for engagement with an appropriate portion of the robot.

In a first form of the fourth aspect, the electrical power layer is a removable battery pack, and the base layer has a terminal for electrical coupling with the battery pack formed thereon.

In a second form of the fourth aspect, the electrical power layer comprises a secondary battery which is chargeable and reusable. The battery is, for example, a lithium ion polymer secondary battery which uses gel polymer electrolyte.

In the legged mobile robot of the first aspect of the present invention, in order to determine the state of contact of the robot with the external world, sensors which can measure contact pressure are disposed so as to be distributed at corresponding portions of the whole body of the robot. In addition, external modules which use shock-absorbing members for reducing shock are disposed at the corresponding portions of the whole body of the robot. The external module forms the structure of the third aspect of the present invention.

Each external module covers its corresponding portion of the robot, and acts as an external part for protecting the robot from external shock. The external module of the third aspect may be constructed so as to be removable from the body of the robot.

The external modules are given forms/structures which allow them to fit the upper limbs, the lower limbs, the front portion and the back portion of the trunk, the arms, etc. With this being included as part of the designing process, they can be united with the robot.

By using, for example, pressure sensors which can measure contact pressures in the external modules, the contact locations can be determined even when the robot comes into contact with a soft object. In addition, it is possible to determine the degree of contact (such as whether the robot is lightly or strongly in contact with an external object).

When a plurality of sensors which can measure contact pressure are disposed so that they are distributed throughout the whole body of the robot, pieces of information concerning the contact areas of portions of the corresponding external modules can be provided. By providing a shock-absorbing member near the measurement surface of each sensor, the range which each sensor can measure is increased by the pressure transmitting action of each shock-absorbing member. Therefore, it is possible to measure a wider range with a small number of sensors.

By using sheet-type pressure sensors, the contact pressures of various measurement points can be measured, so that pieces of information concerning the contact areas of portions of the corresponding external modules can be provided. By disposing a shock-absorbing member at the surface of each external module, it is possible to reduce shock which is produced when the robot falls down or comes into contact or collides with an obstacle or other external objects. Therefore, the output from each sensor and, thus, the controlling operation can be kept stable.

By constructing the sensors in modules which function as external parts, the devices installed inside the robot can be protected. In addition, by disposing each external module on the surface of its corresponding movable portion, such as a joint, interference between portions of the robot by its own movement (such as interference between the trunk and an arm) can be prevented from occurring.

By providing a shock-absorbing member on the surface of each external module, it is possible to protect each sensor from a large shock which is produced, for example, when the robot falls down or collides with an obstacle.

By constructing each external module which acts as a sensor so as to be removable from the body of the robot, the internal devices can be easily accessed, so that maintainability of the robot is enhanced.

According to the second and fourth aspects of the present invention, component parts other than the main power supply such as batteries, that is, small power supply modules are distributed in the empty space of the robot, so that space distribution is improved.

When batteries are provided in the external modules, they become relatively heavy. However, by constructing them so as to be removable from the body of the robot, and adjusting the location of the center of gravity of the robot depending on whether or not external modules are provided at their corresponding portions, the degree of balance in terms of its weight can be improved. As a result, the walking and other movements of the robot can be stabilized.

By mounting the battery-contained external modules near sensors and other functional parts which operate using electrical power, it is possible to supply electrical power to each location without using the main power supply of the robot. In this case, it is possible to reduce the length of each electrical power line connected to its corresponding functional part, so that the designing of the wiring which becomes a problem when reducing the size of the robot and achieving higher density in the robot can be greatly simplified.

In addition, by mounting the battery-contained external modules near sensors and other functional parts which operate using electrical power, the power supplies of the sensors and the other functional parts can be separated from the main power supply. As a result, the functional parts are freed from the influences of the noise which is generated when, for example, the actuation of the joint actuators is started or stopped.

Other objects, features, and advantages of the present invention will become manifest from a more detailed description with reference to embodiments of the present invention described below and the attached drawings.

DESCRIPTION OF THE PREFERRED EMBODIMENTS

Hereunder, a description of preferred embodiments of the present invention will be given in detail with reference to the drawings.

Figure 1:
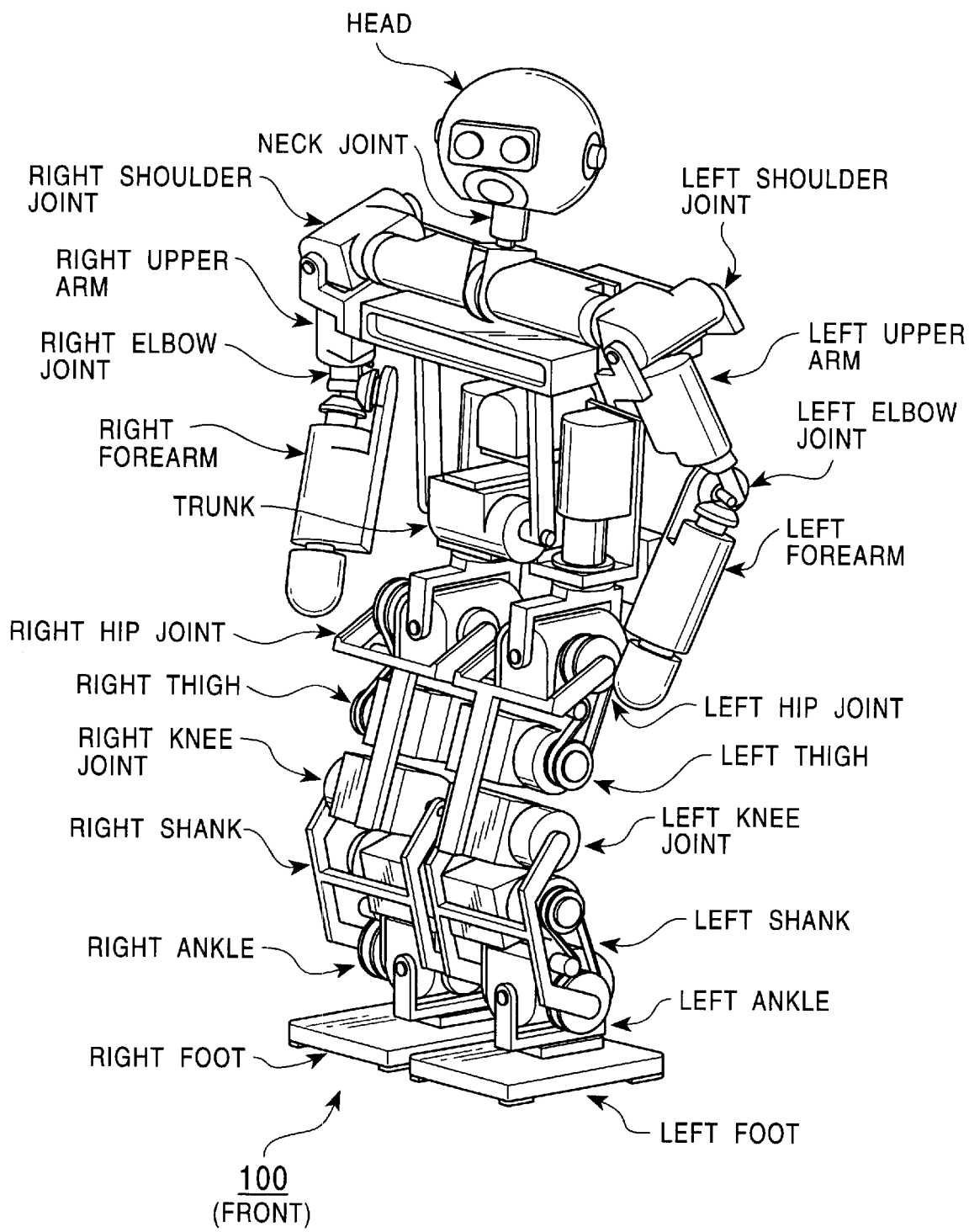
FIG. 1 is a front view of a legged mobile robot 100 (which does not have external modules mounted thereto) of an embodiment of the present invention.
Figure 2:
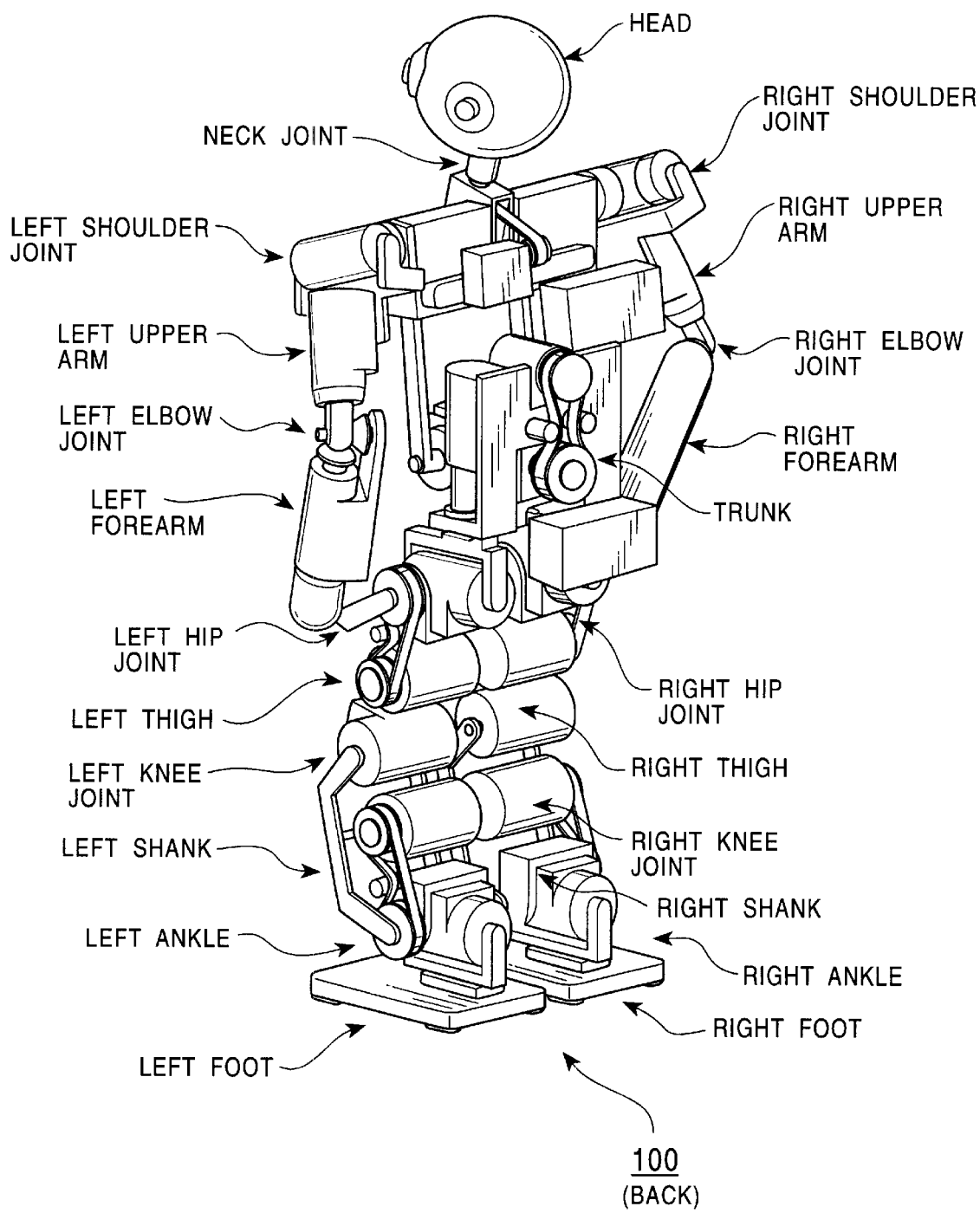
FIG. 2 is a back view of the legged mobile robot 100 (which does not have external modules mounted thereto) of the embodiment of the present invention.

FIGS. 1 and 2 are front and back views showing a humanoid legged mobile robot 100 of an embodiment of the present invention which is in an upright posture. As shown in the figures, the legged mobile robot 100 comprises lower limbs or left and right legs used for movement, a trunk, left and right upper limbs, and a head.

The left and right lower limbs each comprise a thigh, a knee joint, a shank, an ankle, and a foot. They are connected to substantially the bottom end of the trunk by corresponding hip joints. The left and right upper limbs comprise corresponding upper arms, elbow joints, and forearms. They are connected to their corresponding left and right upper side edges of the trunk by corresponding shoulder joints. The head is connected to substantially the uppermost end center portion of the trunk by a neck joint.

A central control system which cannot be seen in FIGS. 1 and 2 is disposed inside a trunk unit.

The center control system is a case in which a controller (a main control section) for controlling the actuation of each joint actuator making up the legged mobile robot 100 and for processing externally input information from, for example, each sensor (described later), and a peripheral device such as a power supply circuit are installed. The control section may also include a remote-control communications interface or a communications device. For example, the central control system may be installed on the body of the robot 100 so that the legged mobile robot 100 carries the central control system on its back. However, the place where the central control system is disposed is not particularly limited.

Figure 3:
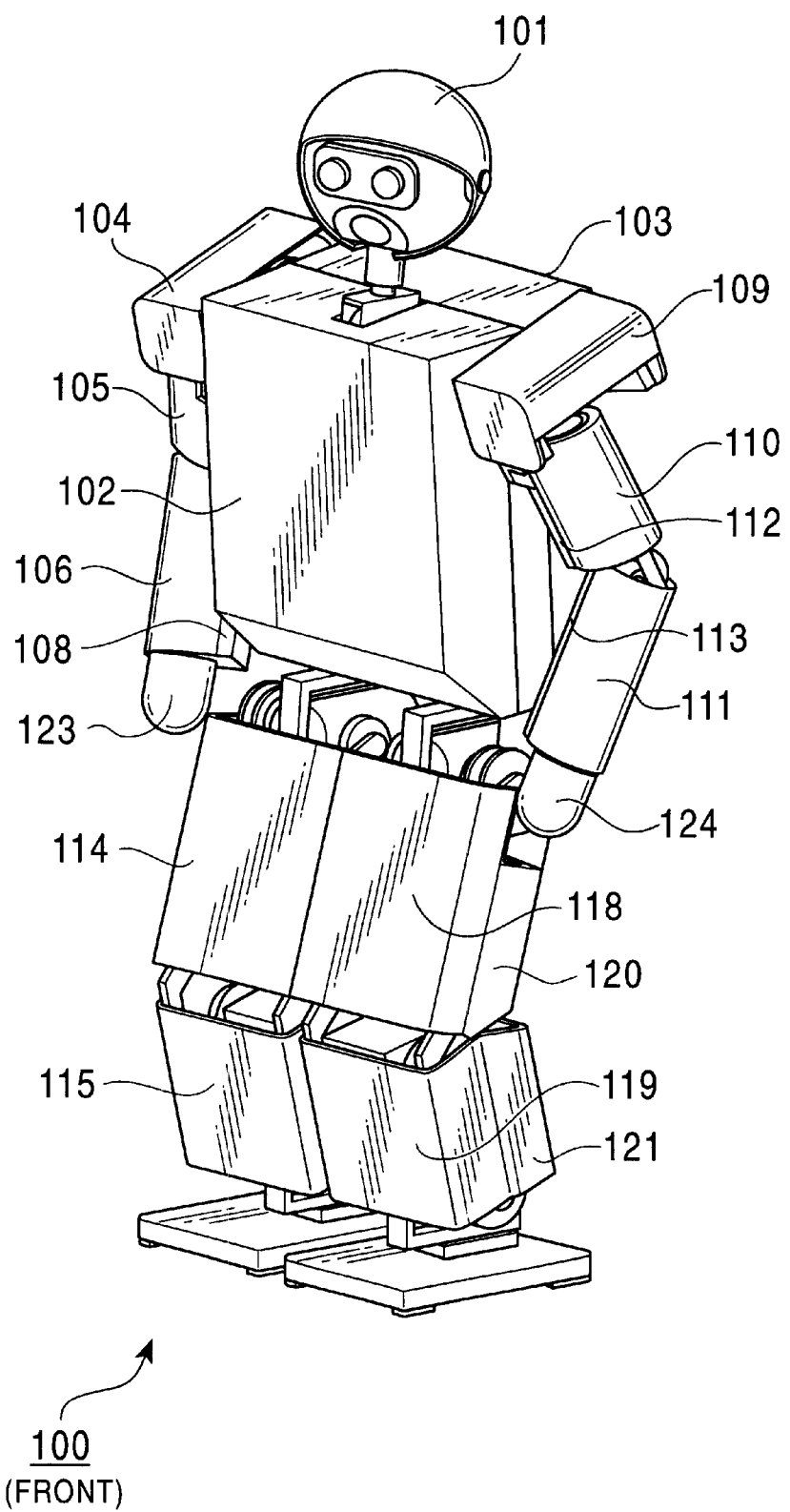
FIG. 3 is a front view of the legged mobile robot 100 (which has all external modules mounted thereto) of the embodiment of the present invention.
Figure 4:
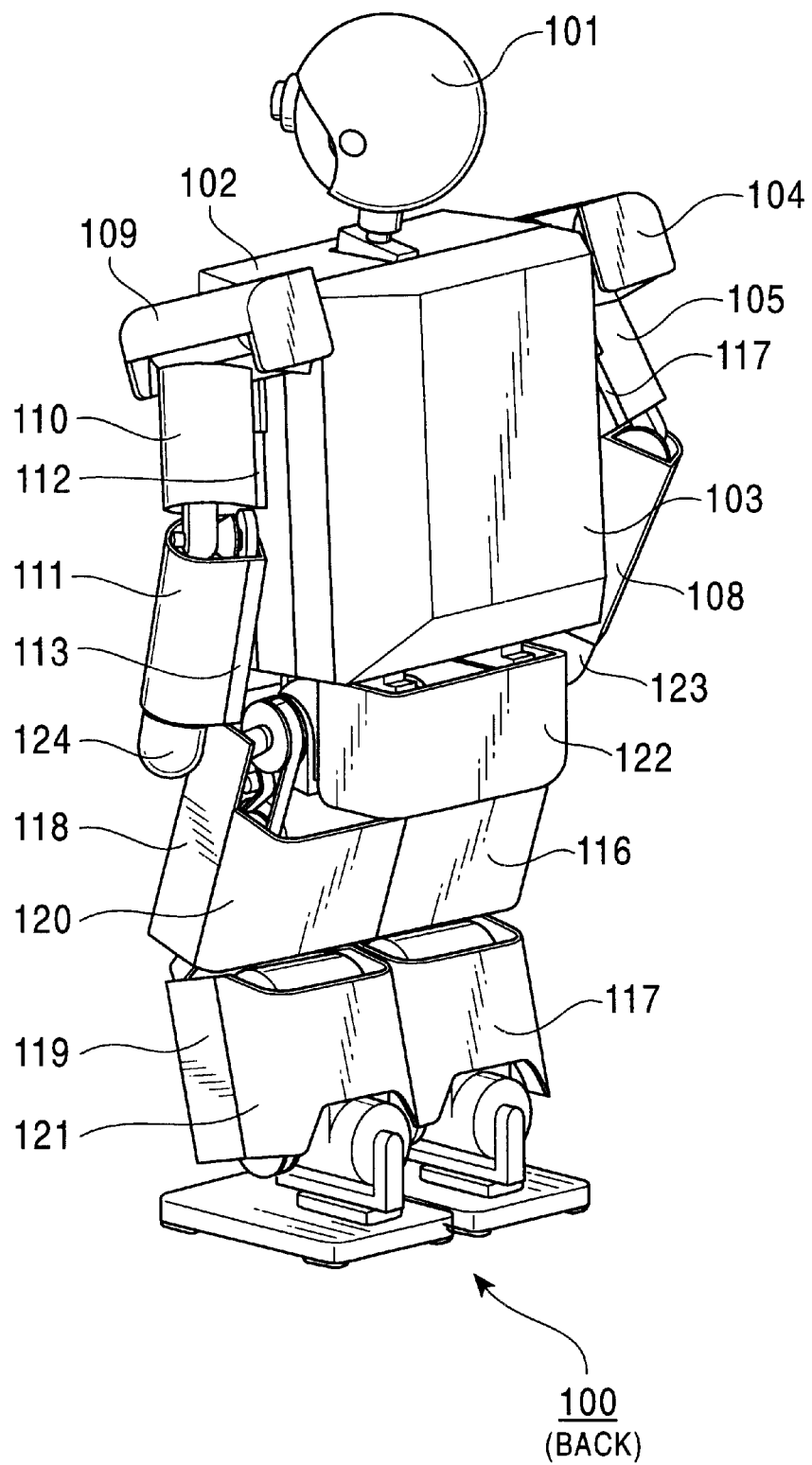
FIG. 4 is a back view of the legged mobile robot 100 (which has all the external modules mounted thereto) of the embodiment of the present invention.

FIGS. 3 and 4 are front and back views showing a state in which the legged mobile robot 100 which has external modules mounted to corresponding portions of its whole body stands erect.

As shown in each of these figures, the legged mobile robot 100 has each of the following external modules mounted thereto as external parts. These external modules are a head external module 101, a trunk front portion external module 102, a trunk back portion external module 103, a right shoulder external module 104, a right upper arm outer portion external module 105, a right forearm outer portion external module 106, a right upper arm inner portion external module 107, a right forearm inner portion external module 108, a left shoulder external module 109, a left upper arm outer portion external module 110, a left forearm outer portion external module 111, a left upper arm inner portion external module 112, a left forearm inner portion external module 113, a right thigh front portion external module 114, a right crus front portion external module 115, a right thigh back portion external module 116, a right crus back portion external module 117, a left thigh front portion external module 118, a left crus front portion external module 119, a left thigh back portion external module 120, a left crus back portion external module 121, a buttocks external module 122, a right hand external module 123, and a left hand external module 124.

The structure of the external modules 101 to 124 which are provided so as to cover the whole body of the legged mobile robot 100 is not necessarily limited to the above-described structure. In the example of the structure shown in FIGS. 3 and 4, the trunk of the legged mobile robot 100 is divided into a front portion and a back portion in order to removably dispose the external modules 102 and 103 to their corresponding portions. However, the trunk may be divided into four portions, that is, the front portion, the back portion, and the left and right side portions, in order to dispose four external modules so as to cover the trunk.

These external modules 101 to 124 are, as described below, constructed so as to be easily removable from the body of the legged mobile robot 100. Therefore, they can be supplied to end users as optional parts of the legged mobile robot 100. For example, in order to detect the contact pressure of, for example, only a leg, only an arm, only the head, or only the trunk, or to increase the strength of a mechanical unit, the user can select the necessary external module. In addition, by removing any of the external modules 101 to 124, the user can easily access an internal mechanism, thereby enhancing the maintainability of the robot 100.

By only mounting the external modules 101 to 124 to their corresponding portions of the body of the legged mobile robot 100, the robot is not only mechanically protected, but also designed so that electrical connection to a control/processing system disposed at the body side is completed at the same time, so that high operability is achieved.

As described below, at the side of the external modules 101 to 124, in addition to the sensors, circuit boards which have mounted thereto, for example, AD converters for converting the outputs of the sensors into digital signals and microprocessors for subjecting the digital signals to suitable computing operations may be installed. In this case, the central control system at the body side of the legged mobile robot 100 no longer needs to process all of the sensor outputs from the external modules 101 to 124, which are disposed so as to be distributed throughout the whole body of the robot 100. It only needs to receive the processed results from the external modules 101 to 124. Therefore, the computation load of the central control system is reduced, resulting in reduced costs.

A description of the structure of an external module which is a removable part of the legged mobile robot 100 will now be given in detail.

Figure 5:
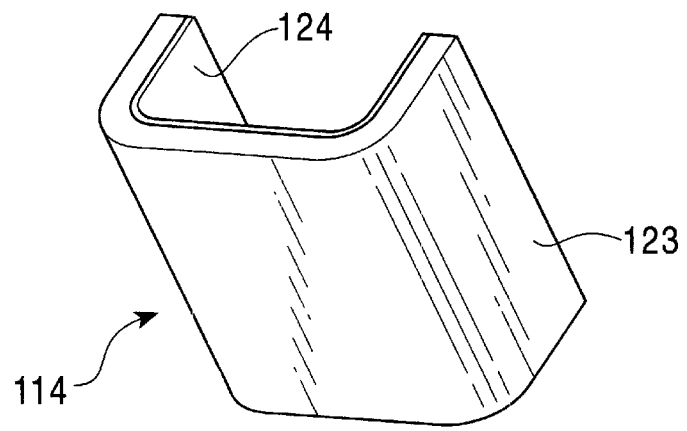
FIG. 5 illustrates the external structure of a right thigh front portion external module 114, which is seen from the outside thereof.
Figure 6:
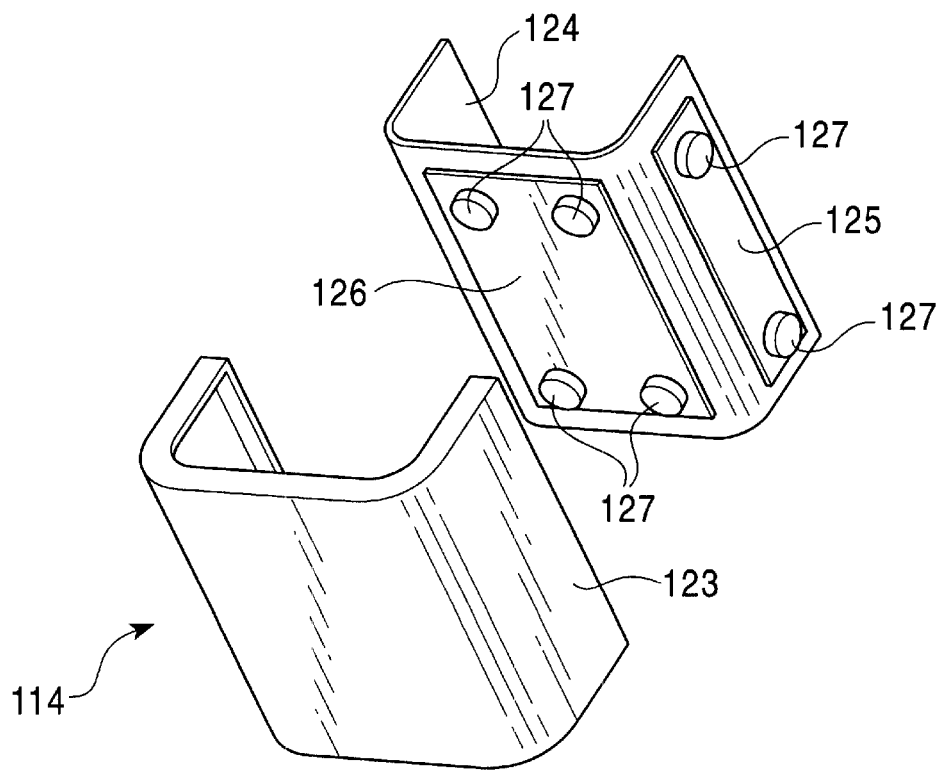
FIG. 6 is an exploded view of the right thigh front portion external module 114, which is seen from the outside thereof.

FIG. 5 illustrates the external structure of the right thigh front portion external module 114, viewed from the outside thereof. FIG. 6 is an exploded view of the right thigh front portion external module 114, viewed from the outside thereof. As shown in FIGS. 3 and 4, the external module 114 is a substantially U-shaped structure in cross section. By combining it with the right thigh back portion external module 116, they are disposed so as to completely cover the outer periphery of the right thigh of the legged mobile robot 100. Although not illustrated, it is to be understood that the other external modules have substantially the same structures as the external module 114 shown in FIGS. 5 and 6.

As can be seen from FIG. 5, the right thigh external module 114 has a substantially U-shaped cross section structure having an open top side. The open side of the U-shaped structure of the right thigh external module 114 and that of the right thigh back portion external module 116 having substantially the same shape are made to face each other in order to link them together, thereby making it possible to cover the right thigh.

As shown in FIG. 6, the right thigh front portion external module 114 is a structure which is formed by placing upon each other a base plate 124 which is the framework of the external module 114 and a shock-absorbing member 123 which reduces externally applied shock and which transmits contact pressure. More than one circuit board, that is, circuit boards 125 and 126, are installed on the base plate 124 in order to perform surface mounting of various electrical circuit components, including sensors 127. A plurality of the pressure-sensitive sensors 127 for detecting contact pressure which is primarily applied to a right thigh side portion are mounted on the circuit board 125, whereas a plurality of the pressure-sensitive sensors 127 for detecting contact pressure which is primarily applied to the right thigh front portion are mounted on the circuit board 126.

Each pressure-sensitive sensor 127 is a sensor of the type which can extract the size of the applied contact pressure as an electrical output signal. By subjecting the output of each sensor to a predetermined computing operation, the contact pressure to the right thigh can be measured. As shown in FIG. 6, since, in the embodiment, the plurality of pressure-sensitive sensors 127 are disposed so as to be distributed throughout the right thigh, it is possible to obtain information regarding the area and location of contact of the surface of the external module 114 with an external object.

Since the shock-absorbing member 123 is laid at the surface of the external module 114 so as to cover each pressure-sensitive sensor 127, it is possible to reduce shock which is applied when the robot 100 comes into contact or collides with an external object. In addition, by the pressure transmission action of the shock-absorbing member 123, the contact pressure detectable area of each pressure-sensitive sensor 127 can be increased. As a result, using a relatively small number of pressure-sensitive sensors 127, the contact pressure of the whole surface of the external module 114 can be detected.

Figure 7:
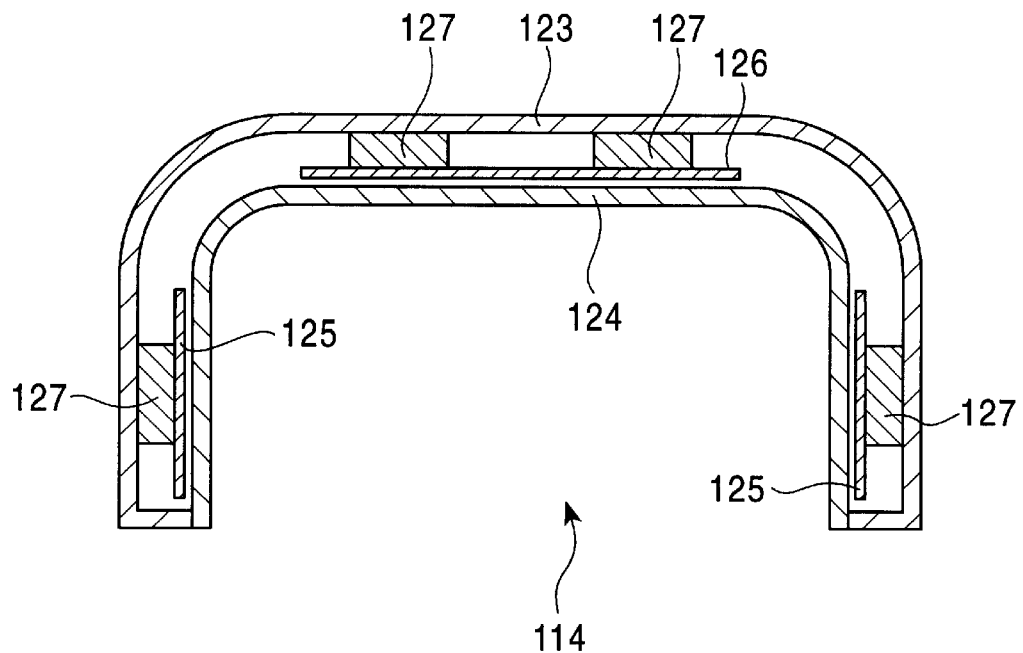
FIG. 7 is a horizontal sectional view of the right thigh front portion external module 114.

FIG. 7 is a horizontal sectional view of the right thigh front portion external module 114. As mentioned above, the external module 114 is a substantially U-shaped structure which is formed by placing the shock-absorbing member 123 and the base plate 124 upon each other.

As shown in FIG. 7, a gap having a predetermined width is formed between the shock-absorbing member 123 and the base plate 124, with the circuit boards 125 and 126 and the pressure-sensitive sensors 127 being disposed inside this gap.

Figure 8:
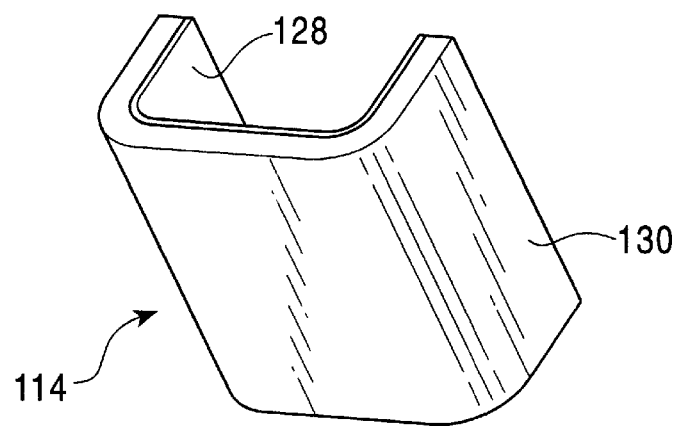
FIG. 8 illustrates the external structure of another right thigh front portion external module 114, which is seen from the outside thereof.
Figure 9:
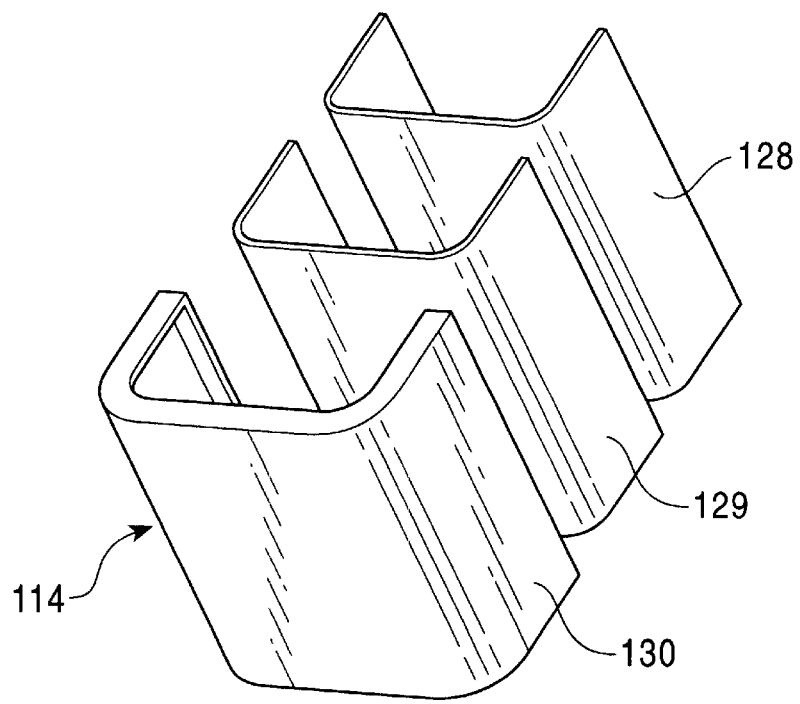
FIG. 9 is an exploded view of the another right thigh front portion external module 114, which is seen from the outside thereof.
Figure 10:
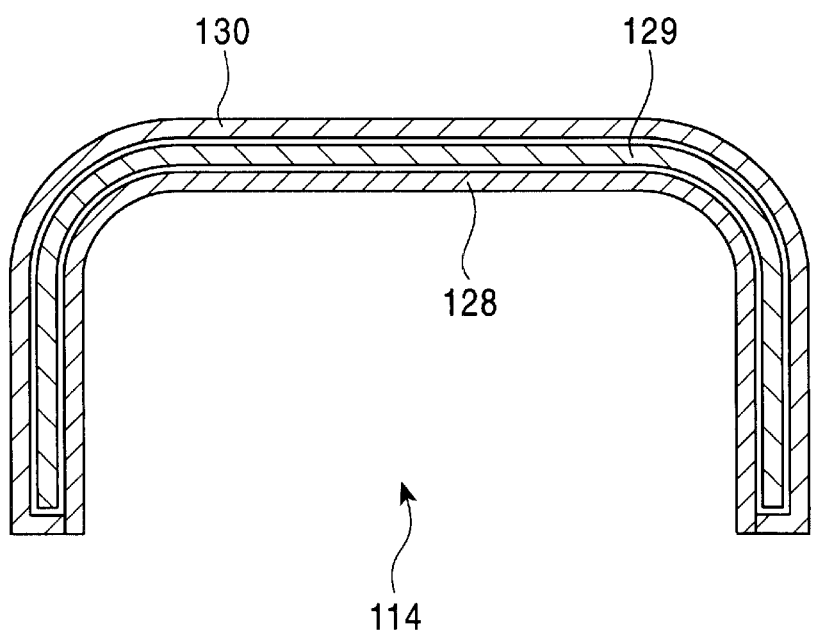
FIG. 10 is a horizontal sectional view of the another right thigh front portion external module 114.

FIG. 8 illustrates the external structure of a right thigh front portion external module 114 of another embodiment of the present invention; FIG. 9 is an exploded view of the right thigh front portion external module 114; and FIG. 10 is a horizontal sectional view of the right thigh front portion external module 114. Although, in the previous embodiment, the sensors 127 are substantially rectangular parallelepiped chip-like sensors, in this embodiment, a sensor 129 is a sheet-shaped sensor, and is constructed so as to be laid on the surface of a base plate 128.

Examples of the sheet-shaped sensor 129 include sensor sheet "I-SCAN S-I-1" and sensor sheet "BIG-MAT S-B-1" which are produced by Newlong Seimitsu Kogyo (Kabushiki-kaisha). These types of sensor sheets respond to the application of pressure by an object, and periodically scan row electrodes and column electrodes in order to successively incorporate the electrical resistance at each point of intersection. The processing of the input information by a computer allows it to be converted into information regarding power in a plane.

As shown in FIGS. 9 and 10, the right thigh front portion external module 114 is a structure which is formed by placing the base plate 128, the sheet-shaped pressure sensor 129, and a shock-absorbing member 130 upon each other in that order.

The sheet-shaped pressure sensor 129 is a sensor of the type which has a plurality of detection points on one sheet, and which can extract the pressure value at each detection point as an electrical signal. By processing the output from the sensor, the pressure value at each detection point can be measured. By using the sheet-shaped pressure sensor 129, it is possible to know at the same time what amount of contact pressure is being applied to what location of the surface of the external module 114, that is, the positional and strength data, so that the contact state of the robot 100 with the external object can be known.

Figure 11:
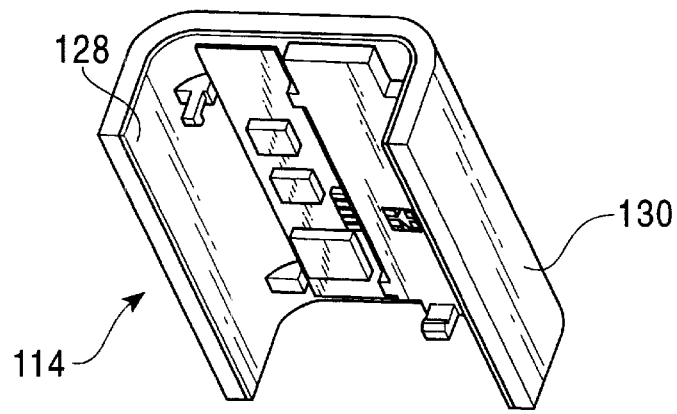
FIG. 11 illustrates the external structure of the another right thigh front portion external module 114, which is seen from the inside thereof.
Figure 12:
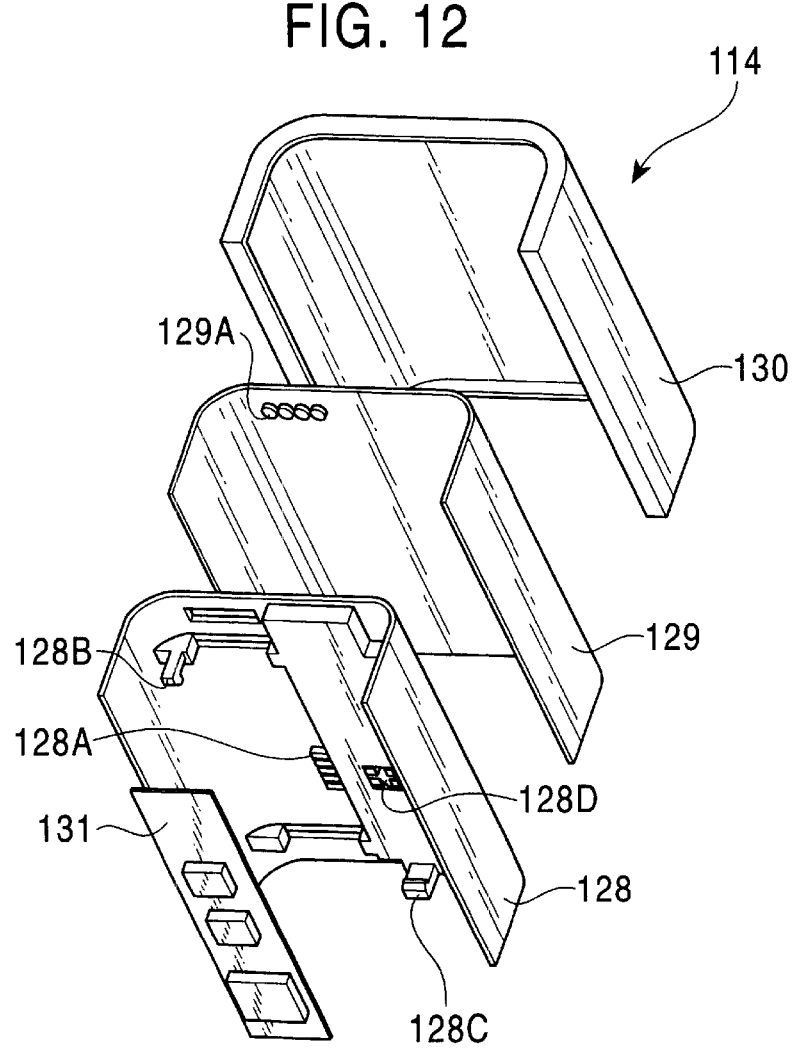
FIG. 12 is an exploded view of the another right thigh front portion external module 114, which is seen from the inside thereof.

FIG. 11 shows the external structure of the right thigh front portion external module 114 shown in FIGS. 8 to 10, viewed from the inside thereof. FIG. 12 is an exploded view of the right thigh front portion external module 114, viewed from the inside thereof.

As shown in FIG. 12, a connector 129A which comprises an electrical signal output terminal and the like is disposed at substantially the top end of the sheet-shaped pressure sensor 129 in the plane of FIG. 12. The connector 129A is used to achieve electrical connection with a circuit board 131 through a through hole which is formed in a portion of the base plate 128 corresponding to the location of the connector 129A.

A connector 128A for connection with the circuit board 131 is disposed on the base plate 128. In addition, protruding hooks 128B and 128C for engagement with a right thigh frame (described later) at the body side of the robot 100 and a connector 128D for connection with the body frame are disposed on the base plate 128.

The elements 128B, 128C, and 128D which are disposed on the base plate 128 may be integrally formed with the base plate 128 itself, but, as shown in FIG. 12, may be formed in combination with other structural parts.

On the surface of the circuit board 131 are mounted electrical circuit components such as an interface circuit for communication with the central control section which is disposed at the body, and a microprocessor for subjecting the output of the sheet-shaped pressure 129 to a computing operation.

Figure 13:
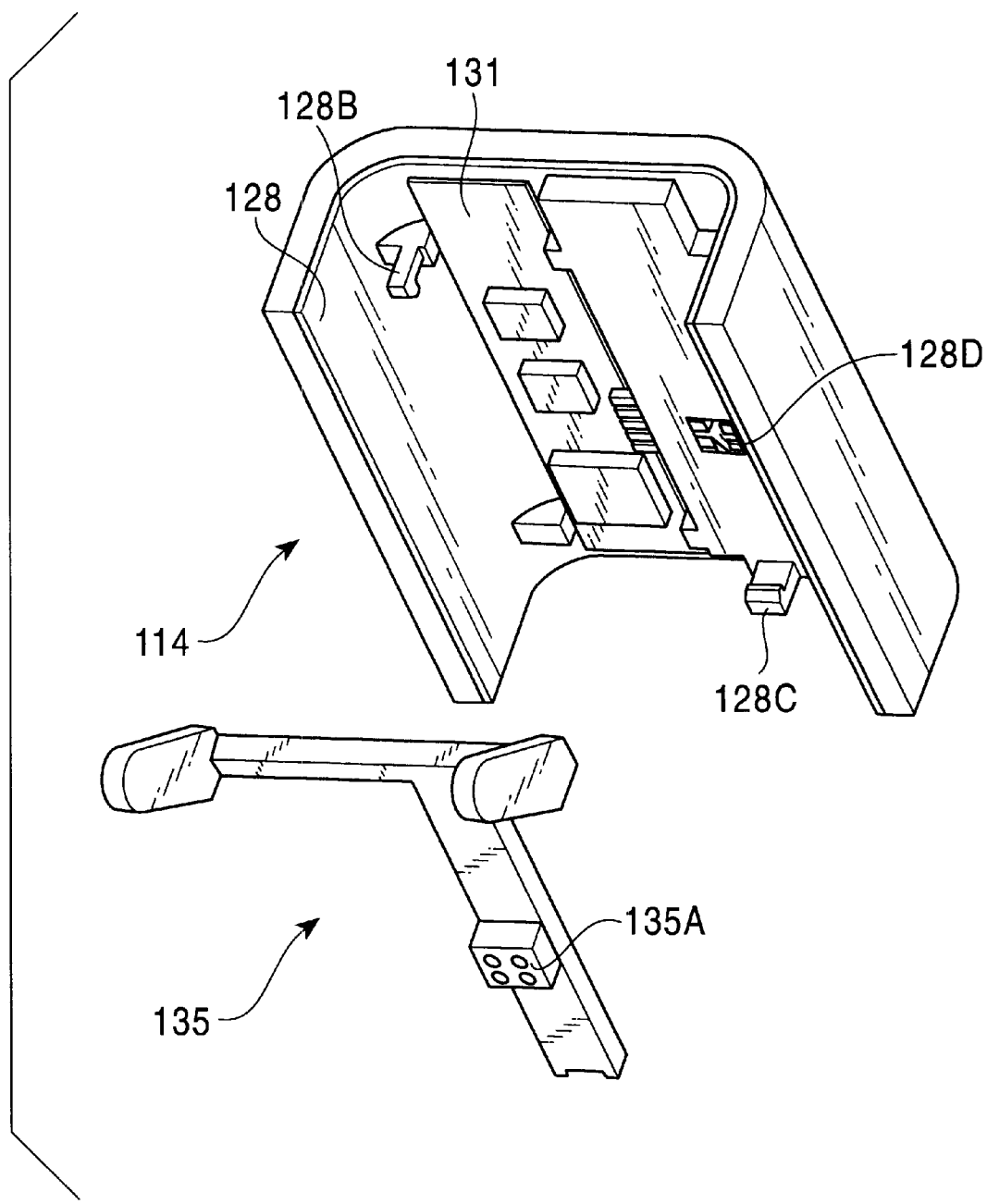
FIG. 13 illustrates a state in which the another right thigh front portion external module 114 is mounted to a right thigh frame 135 which is provided at the body of the legged mobile robot 100.

FIG. 13 illustrates a state in which the right thigh front portion external module 114 is mounted to a right thigh frame 135 disposed at the body of the legged mobile robot 100.

In the example shown in the figure, the right thigh frame 135 is a substantially T-shaped structure. The hooks 128B and 128C and the other hooks which are hidden in FIG. 13 for engagement with the frame 135 are provided so as to protrude from the substantially U-shaped bottom surface of the right thigh front portion external module 114.

As shown in the figure, the external module 114 mechanically engages the right thigh frame 135 which is disposed at the robot body 100 side through the two hooks 128B and 128C. The body connection connector 128D engages a linking connector 135A disposed on the frame 135 in order to be electrically connected to the robot body 100, making it possible to transmit the results of the computation of the sensor output to the central processing system of the robot 100.

Figure 14:
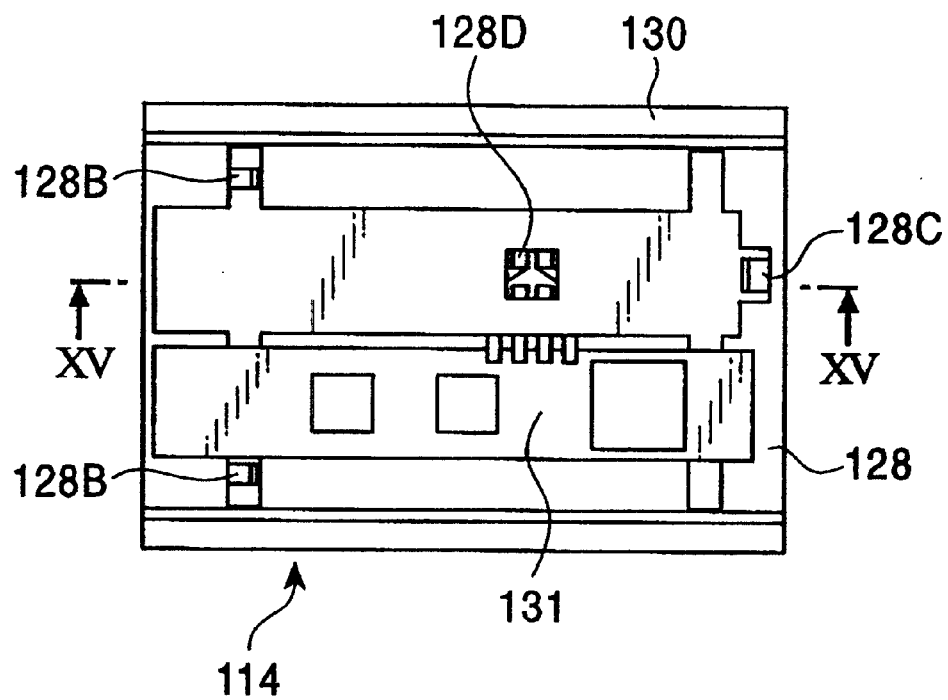
FIG. 14 illustrates the inside of the right thigh front portion external module 114 viewed from thereabove.
Figure 15:
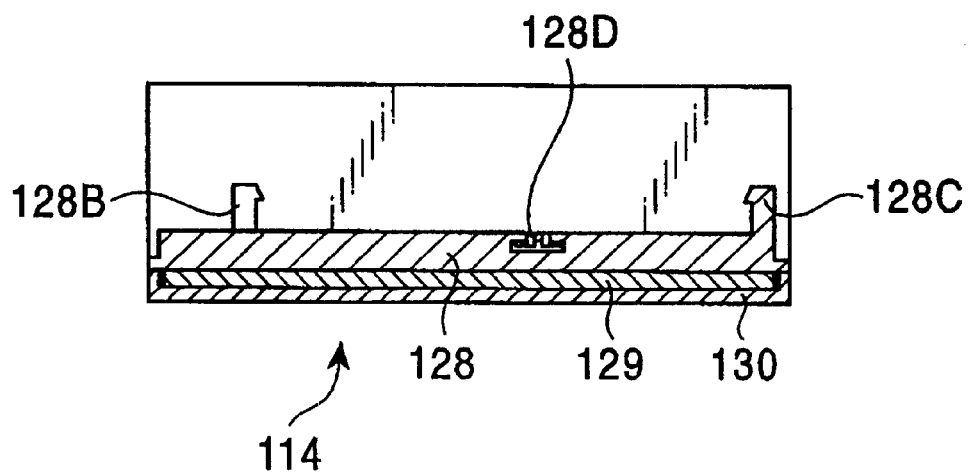
FIG. 15 is a sectional view of the right thigh front portion external module 114 shown in FIG. 14 taken along line XV—XV.

FIG. 14 shows the inside of the right thigh front portion external module 114 viewed from the top thereof. FIG. 15 is a sectional view of the right thigh front portion external module 114 taken along line XV—XV in FIG. 14.

Figure 16:
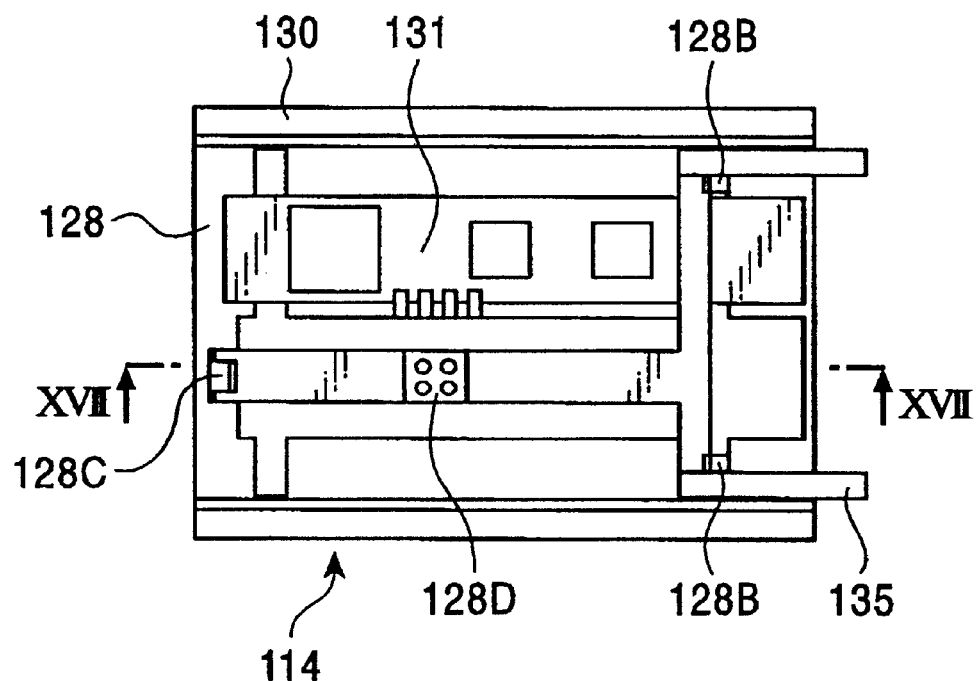
FIG. 16 illustrates the inside of the right thigh front portion external module 114 which is mounted to the right thigh frame 135.
Figure 17:
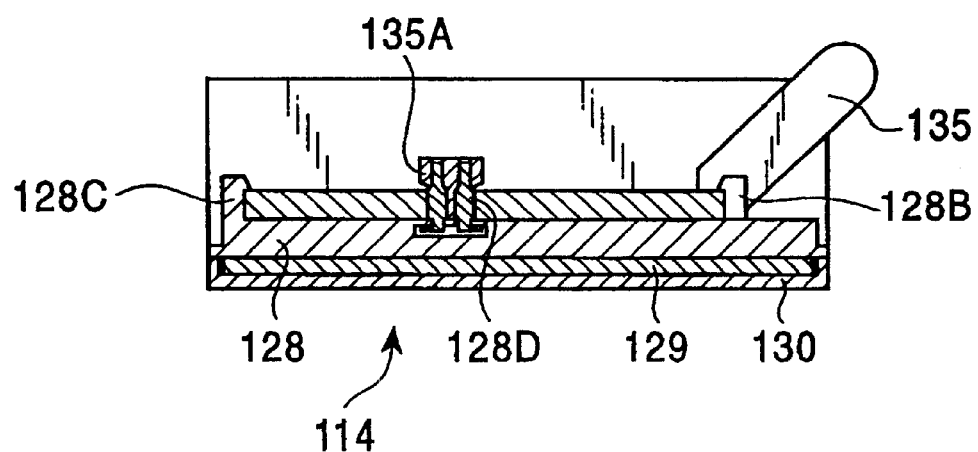
FIG. 17 is a sectional view of the right thigh front portion external module 114 which is mounted to the right thigh frame 135 taken along line XVII—XVII.

FIG. 16 shows the right thigh front portion external module 114 which is mounted to the right thigh frame 135 viewed from the inside thereof. FIG. 17 is a sectional view of the right thigh front portion external module 114 which is mounted to the right thigh frame 135 taken along line XVII—XVII of FIG. 16.

As shown in FIG. 17, the external module 114 is mechanically mounted to the body of the robot 100 as a result of engaging the hooks 128B and 128C with corresponding portions of the frame 135. By engaging the connector 128C disposed on the external module 114 with the connector 135A disposed on the body frame 135, the external module 128 and the robot body 100 are electrically connected together.

Figure 18:
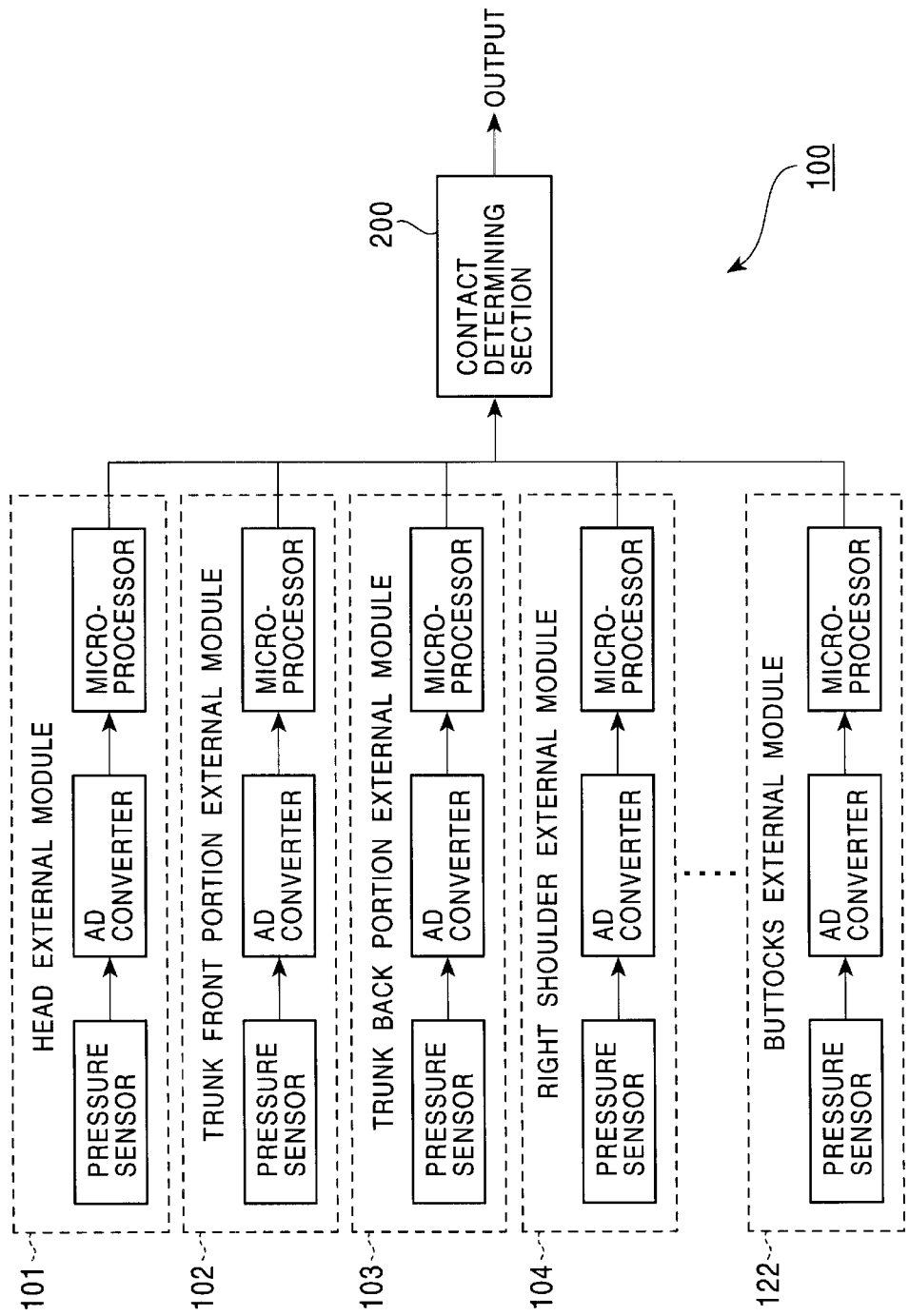
FIG. 18 is a block diagram illustrating a contact determining function which is based on the sensor outputs from a sensor module 101 to a buttocks external module 122.

FIG. 18 is a block diagram of the functions for determining any contacting of the robot with the external world in the embodiment. As shown in the figure, the structure shown in block diagram incorporating a function for determining any contacting of the robot with the external world comprises the external modules 101, 102, etc. (see FIGS. 3 and 4), which are removably mounted to the corresponding portions of the whole body of the legged mobile robot 100, and a contact determining section 200 for controlling in a centralized manner information regarding the pressure at each portion (which is produced when it comes into contact with the external world) as a result of inputting the computation results which have been output from the external modules 101, 102, etc.

As shown in the figure, the external modules 101, 102, etc. each comprise a pressure sensor, an AD converter for converting the output of its corresponding sensor into a digital signal, and a microprocessor for subjecting its corresponding digital signal to a proper computing operation.

As illustrated with reference to FIGS. 5 to 7, each pressure sensor may be a chip-like pressure-sensitive sensor 127, or, as illustrated with reference to FIGS. 8 to 10, each pressure sensor may be a sheet-shaped pressure sensor 129 whose output includes surface information.

The AD converters and the microprocessors are mounted onto the surfaces of the circuit boards 125/126 and the circuit boards 131 of the external modules.

As mentioned above, the external modules 101 to 124 are constructed so as to be removable from the body of the legged mobile robot 100. The external modules 101 to 124 are optional parts of the body of the robot 100, so that not all of the external modules are necessarily disposed on the whole body of the robot 100 (for example, one may select and use an external module required to detect the contact pressure of only a leg, only an arm, only the head, or only the trunk and/or required to increase the strength of the mechanical unit).

In the embodiment, each external module supplies its corresponding processed sensor output result to the contact determining section 200. Therefore, the contact determining section 200 does not need to process any analog signal which is output from each pressure sensor which is mounted to each portion of the robot 100, so that it only needs to make an overall determination of the computation result which is provided by each external module.

The contact determining section 200 is, for example, mounted at the central control system (not shown) used for executing a general controlling operation on the movement of the whole body of the legged mobile robot 100. Presently, the contact determining section 200 is capable of controlling in a centralized manner what amount of contact pressure is being applied to what location of the robot 100, and of estimating, for example, the volume, the mass, the hardness, and the material of the object with which the robot 100 is in contact as a result of analyzing the contact pressure data at each portion, so that the object itself can be specified.

In accordance with, for example, user commands, the central control system sets the movement of the feet, the ZMP (zero moment point) path, the movement of the trunk, the movement of the upper limbs, the height of the waist, etc., of the legged mobile robot 100, and, transmits commands for operations in accordance with the aforementioned settings to corresponding actuating sections, such as corresponding joint actuators, which are disposed on the whole body. Here, the ZMP is the point on the floor surface where the moment resulting from the floor reaction force when the robot walks is zero. The ZMP path refers to the path of movement of the ZMP when, for example, the legged mobile robot 100 is walking.

The central control system can adaptably control the stable posture and walking of the legged mobile robot 100 by dynamically correcting a control target in response to the output from the contact determining section 200, that is, the information regarding the contact pressure which is applied to each portion of the whole body.

External modules which incorporate batteries rather than sensors will now be described. When batteries are incorporated in the external modules, the external modules become relatively heavy. However, when the external modules are constructed so as to be removable from the body of the robot, and the location of the center of gravity of the robot is adjusted depending on whether or not the external modules are mounted to corresponding portions of the robot, the degree of balance of the robot in terms of its weight can be increased. As a result, the walking and other movements of the robot can be stabilized.

By mounting the battery-contained external modules near the sensors and other functional parts which operate using electrical power, it is possible to supply electrical power to each location without using the main power supply of the robot. In this case, it is possible to reduce the length of each electrical power line connected to its corresponding functional part, so that the designing of the wiring which becomes a problem when reducing the size and achieving higher density can be greatly simplified.

In addition, by mounting the battery-contained external modules near the sensors and other functional parts which operate using electrical power, the power supplies of the sensors and the other functional parts can be separated from the main power supply. As a result, the functional parts are freed from the influences of the noise which is generated when, for example, the actuation of the joint actuators is started or stopped.

FIGS. 19 to 28 each illustrate the structure of an external module which incorporates a battery 302. The illustrated external module is assumed to correspond to the trunk front portion external module 102 which is removably mounted to the front portion of the trunk of the robot 100 (see FIG. 3).

Figure 19:
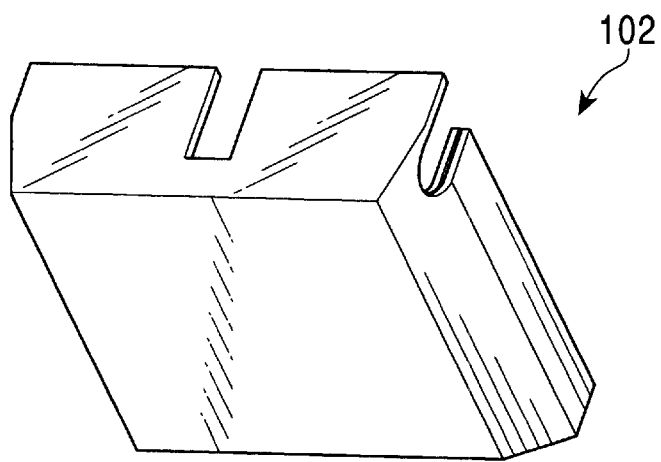
FIG. 19 illustrates the external structure of the trunk front portion external module 102 viewed from the outside thereof.
Figure 20:
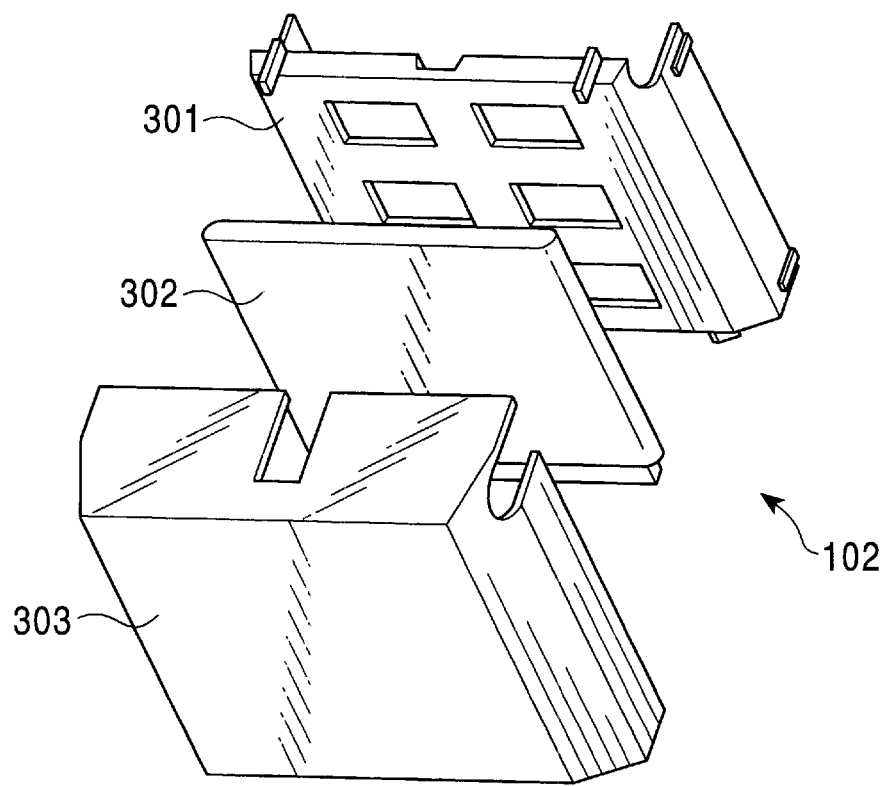
FIG. 20 is an exploded view of the trunk front portion external module 102 viewed from the outside thereof.

FIG. 19 illustrates the trunk front portion external module 102 viewed from the outside of the robot 100. FIG. 20 is an exploded view of the trunk front portion external module 102.

As can be seen from FIG. 19, the trunk front portion external module 102 is a substantially box-shaped structure having an open top side, and is linked to the trunk back portion external module 103 in order to cover the periphery of the trunk of the robot 100.

As shown in FIG. 20, the trunk front portion external module 102 is a structure which is formed by placing upon each other a base plate 301 which is the framework of the external module 102, a battery 302 serving as a power supply which is provided separately of the main power supply (not shown) of the robot 100, and a cover 303 for reducing externally applied shock. On the base plate 301 are mounted a circuit board (not shown) having mounted on its surface an electrical power line for transmitting,electrical power from the battery 302 to locally disposed sensors and other functional parts, and a connector terminal for electrical coupling with the battery 302.

The battery 302 which is used in the embodiment is, for example, a lithium ion polymer secondary battery which uses gel polymer electrolyte. When the remaining capacity of the battery 302 is reduced, the battery 302 can be recharged and, thus, be reused many times.

By replacing an electrolytic solution with the gel polymer electrolyte, a thin, light lithium ion battery can be constructed, so that, as shown in FIG. 20, the battery 302 can be inserted in a gap between the base plate 301 and the cover 303. An example of the lithium ion secondary battery is a lithium ion polymer secondary battery "UP383562" which is produced by Sony Corporation.

Figure 21:
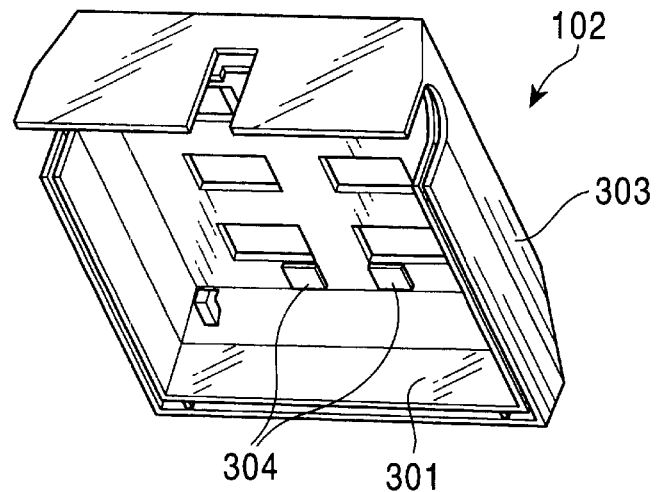
FIG. 21 illustrates the external structure of the trunk front portion external module 102 viewed from the inside thereof.
Figure 22:
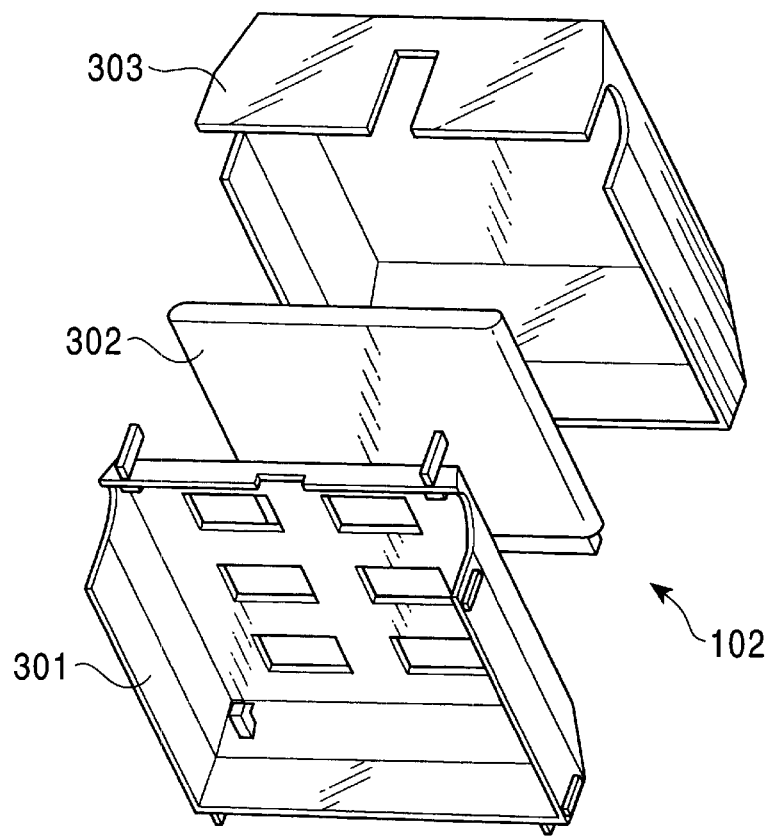
FIG. 22 is an exploded view of the trunk front portion external module 102 viewed from the inside thereof.

FIG. 21 illustrates the external structure of the trunk front portion external module 102 shown in FIGS. 19 and 20 viewed from the inside thereof. FIG. 22 is an exploded view of the trunk front portion external module 102 viewed from the inside thereof.

As shown in FIG. 21, a battery terminal 304 is disposed on the bottom surface of the base plate 301. When the battery 302 is placed upon the base plate 301, the battery terminal 304 is used to achieve electrical connection with electrodes and other connector terminals (not shown) which are disposed at the battery 302 side.

Figure 23:
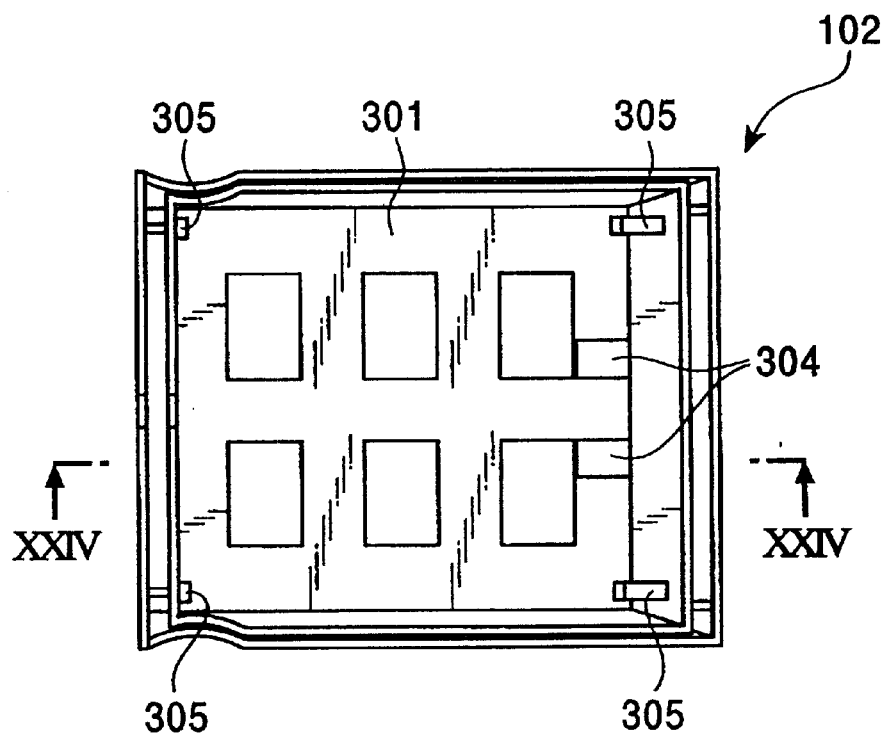
FIG. 23 illustrates the inside of the trunk front portion module 102 viewed from thereabove.
Figure 24:
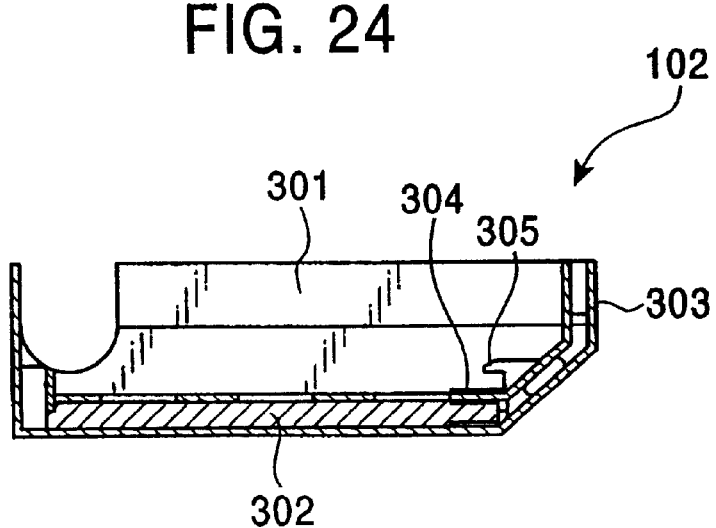
FIG. 24 is a sectional view of the trunk front portion external module 102 shown in FIG. 23 taken along line XXIV—XXIV.

FIG. 23 shows the inside of the trunk front portion external module 102 viewed from thereabove. FIG. 24 is a sectional view of the trunk front portion external module 102 taken along line XXIV—XXIV of FIG. 23.

As shown in FIG. 23, hooks 305 used for mounting to the body are formed at substantially the four corners of the bottom surface of the trunk front portion external module 102, and can engage a frame (not shown in FIGS. 23 and 24) disposed at the body side of the robot 100.

Figure 25:
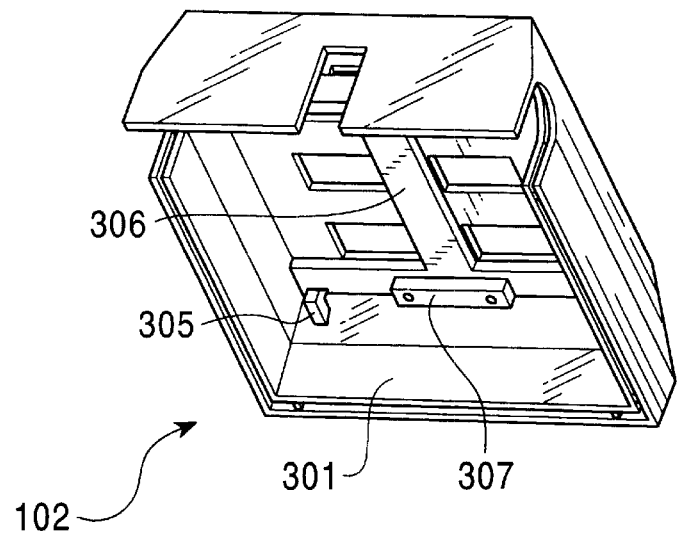
FIG. 25 illustrates a state in which a body trunk frame 306 is mounted to the trunk front portion external module 102.
Figure 26:
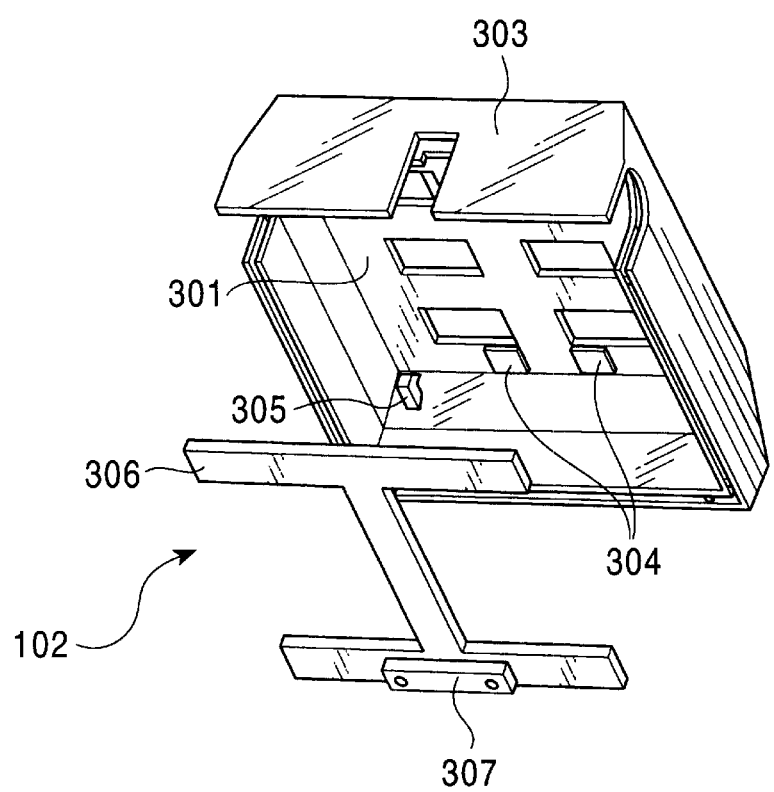
FIG. 26 illustrates a state in which the body trunk frame 306 is mounted to the trunk front portion external module 102.

FIG. 25 shows a state in which a trunk frame 306 disposed at the body is mounted to the trunk front portion external module 102. FIG. 26 shows a state in which the trunk frame 306 disposed at the body is being mounted to the trunk front portion external module 102. For the sake of simplicity, the battery 302 is not shown in these figures.

As shown in FIG. 26, the trunk frame 306 which is a structural element of the body of the robot 100 is a substantially H-shaped structure, with a body linking connector 307 which can be mechanically firmly connected to the body of the robot 100 being disposed on at least one of the bottom sides of the H-shaped structure. As can be seen from FIGS. 25 and 26, the left and right ends of the top and bottom sides of the H-shaped structure are such as to engage the body-mounting hooks 305 on the base plate 301.

Figure 27:
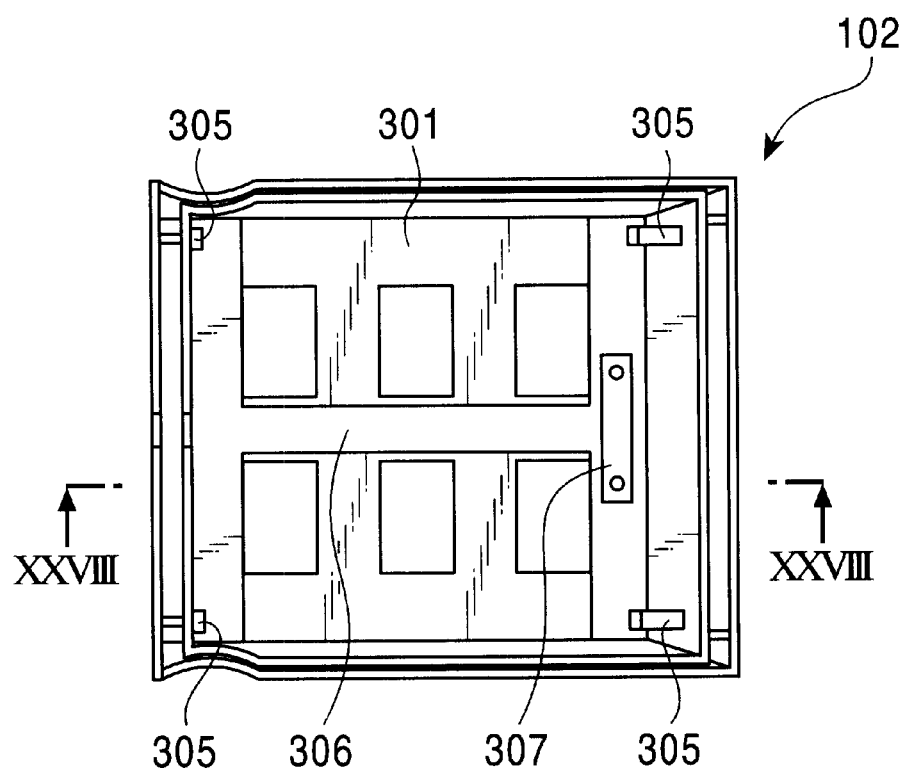
FIG. 27 shows the inside of the trunk front portion external module 102 which is mounted to the trunk frame 306.
Figure 28:
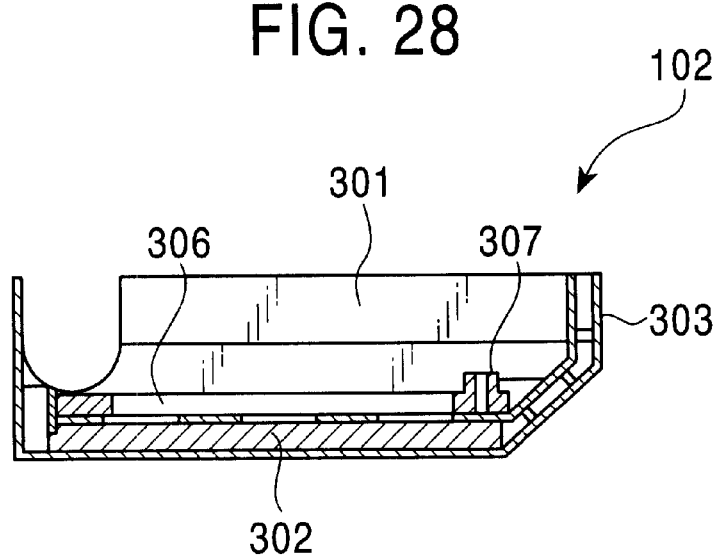
FIG. 28 is a sectional view of the trunk front portion external module 102 shown in FIG. 27 taken along line XXVIII—XXVIII.

FIG. 27 shows the inside of the trunk front portion external module 102 which is mounted to the trunk frame 306. FIG. 28 is a sectional view of the trunk front portion external module 102 which is mounted to the trunk frame 306 taken along line XXVIII—XXVIII. For the sake of simplicity, the battery 302 is not shown in these figures.

As can be seen from FIG. 27, by engaging the left and right ends of the top and bottom sides of the trunk frame 306 which has an H-shaped structure with the mounting hooks 305 which are provided on the base plate 301, the trunk front portion external module 102 is secured to the trunk frame 306.

As shown in FIG. 28, the body linking connector 307 is provided so as to protrude in the height direction of the external module 102, making it possible to engage with the body of the robot 100 (not shown). The body linking connector 307 is constructed so as not only to achieve mechanical coupling but also to achieve electrical connection with the body of the robot 100. In this case, it is possible to supply electrical power of the battery 303 to the body of the robot 100 through the body linking connector 307, to control the battery 303, such as monitoring the remaining capacity of the battery 303, at the body side of the robot 100, and to supply charging electrical current to the battery 303 from the body of the robot 100.

The present invention has been described in detail with reference to particular embodiments of the present invention. However, it is obvious that modifications and substitutions may be made by those skilled in the art without departing from the gist of the present invention. In other words, the present invention has been described in various forms for illustrative purposes only, so that it is to be understood that the present invention is not limited thereto. In order to determine the gist of the present invention, one should refer to the claims of the present invention which are given at the beginning of this document.

As described in detail above, the present invention makes it possible to provide an excellent legged mobile robot which can operate while being subjected to various external forces in the living space/living environment of human beings.

In addition, the present invention makes it possible to provide an excellent legged mobile robot which can independently or semi-independently operate while being subjected to external forces as a result of coming into contact with an obstacle or other external objects, and which makes it possible to reduce shock which is produced when the robot comes into contact with an external object.

Although the external modules of the present invention primarily incorporate sensors which can measure contact pressure for determining the state of contact with the external world, or secondary batteries, they also function as external parts for protecting the robot from external shock by covering their corresponding portions of the robot. The external modules are given forms/structures which allow them to fit the upper limbs, the lower limbs, the front portion and the back portion of the trunk, the arms, etc. With this being included as part of the designing process, they can be united with the robot.

When batteries are incorporated in the external modules, the external modules become relatively heavy. However, when the external modules are constructed so as to be removable from the body of the robot, and the location of the center of gravity of the robot is adjusted depending on whether or not the external modules are mounted to corresponding portions of the robot, the degree of balance of the robot in terms of its weight can be increased. As a result, the walking and other movements of the robot can be stabilized.

By mounting the battery-contained external modules near the sensors and other functional parts which operate using electrical power, it is possible to supply electrical power to each location without using the main power supply of the robot. In this case, it is possible to reduce the length of each electrical power line connected to its corresponding functional part, so that the designing of the wiring which becomes a problem when reducing the size and achieving higher density can be greatly simplified.

In addition, by mounting the battery-contained external modules near the sensors and other functional parts which operate using electrical power, the power supplies of the sensors and the functional parts can be separated from the main power supply. As a result, the functional parts are freed from the influences of the noise which is generated when, for example, the actuation of the joint actuators is started or stopped.

What is claimed is:

1. A legged mobile robot including at least lower limbs and a trunk, the robot comprising:
 an external module which is provided at at least one portion of the robot so as to be removably mounted thereto, the external module including a sensor for measuring contact pressure on surfaces of the robot above the floor contacting surface.

2. A legged mobile robot according to claim 1, wherein the external module is removably mounted to a head of the legged mobile robot.

3. A legged mobile robot according to claim 1, wherein the external module is removably mounted to a front portion or a back portion of the trunk of the legged mobile robot.

4. A legged mobile robot according to claim 1, wherein the external module is removably mounted to a trunk side portion of the legged mobile robot.

5. A legged mobile robot according to claim 1, wherein the external module is removably mounted to a shoulder of the legged mobile robot.

6. A legged mobile robot according to claim 1, wherein the external module is removably mounted to an outer portion or an inner portion of an upper arm of the legged mobile robot.

7. A legged mobile robot according to claim 1, wherein the external module is removably mounted to an outer portion of an inner portion of a forearm of the legged mobile robot.

8. A legged mobile robot according to claim 1, wherein the external module is removably mounted to a front portion or a back portion of a thigh of the legged mobile robot.

9. A legged mobile robot according to claim 1, wherein the external module is removably mounted to a front portion or a back portion of a crus of the legged mobile robot.

10. A legged mobile robot according to claim 1, wherein the external module is removably mounted to buttocks of the legged mobile robot.

11. A legged mobile robot according to claim 1, wherein the external module is removably mounted to a hand of the legged mobile robot.

12. A legged mobile robot according to claim 1, wherein the external module comprises engaging means for engagement with a corresponding portion of the legged mobile robot.

13. A legged mobile robot according to claim 1, wherein the external module comprises a base layer for preserving the shape of the module, a sensor layer for detecting contact pressure which is externally applied, and a shock-absorbing layer for transmitting to the sensor layer shock or contact pressure which is externally applied.

14. A legged mobile robot according to claim 13, wherein the sensor layer comprises a plurality of sensors which are disposed so as to be distributed on the base layer.

15. A legged mobile robot according to claim 13, wherein the sensor layer comprises a sheet-shaped pressure sensor which is laid on the base layer.

16. A legged mobile robot according to claim 13, wherein the external module further comprises a circuit layer having mounted thereto circuit components including an AD converter for converting a sensor output from the sensor layer to a corresponding digital signal and a microprocessor for processing the corresponding converted digital signal.

17. A legged mobile robot according to claim 13, further comprising a contact determining section for controlling in a centralized manner information regarding the contact pressure which is externally supplied, based on the sensor output from the external module.

18. A legged mobile robot including at least lower limbs and a trunk, the robot comprising:
   an actuating section for realizing movement of the lower limbs and/or the trunk, the actuating section being operable by electrical power;
   a computing/controlling section for controlling the operation of the actuating section, the computing/controlling section being operable by electrical power;
   a first power supply section for supplying electrical power to the actuating section and/or the computing/controlling section; and
   an external module which is provided at at least one portion of the robot so as to be removably mounted thereto, the external module including a second power supply section.

19. A legged mobile robot according to claim 18, wherein a sensor for measuring contact pressure or the like is provided at at least one portion of the robot, electrical power being supplied to the sensor from the second power supply section.

20. A legged mobile robot according to claim 18, wherein the external module includes engaging means for engagement with a corresponding portion of the legged mobile robot.

21. A legged mobile robot according to claim 18, wherein the external module further includes a base layer for preserving the shape of the module, an electrical power layer having the second power supply section installed therein, and a covering layer for externally covering the electrical power layer.

22. A legged mobile robot according to claim 21, wherein the second power supply section is a removable battery pack, and wherein the base layer includes a terminal for electrical coupling with the battery pack.

23. A legged mobile robot according to claim 18, wherein the second power supply section is a secondary battery which is chargeable and reusable.

24. An external module for a robot which is removably mounted to the robot, the external module comprising:
   a base layer for preserving the shape of the module;
   a sensor layer for detecting contact pressure which is externally applied;
   a shock-absorbing layer for transmitting to the sensor layer shock or contact pressure which is externally applied; and
   engaging means for engagement with an appropriate portion of the robot.

25. An external module for a robot according to claim 24, wherein the sensor layer comprises a plurality of sensors which are disposed so as to be distributed on the base layer.

26. An external module for a robot according to claim 24, wherein the sensor layer comprises a sheet-shaped pressure sensor which is laid on the base layer.

27. An external module for a robot according to claim 24, further comprising a circuit layer having mounted thereto circuit components including an AD converter for converting a sensor output from the sensor layer to a digital signal and a microprocessor for processing the converted digital signal.

28. An external module for a robot which is removably mounted to the robot, the external module comprising:
   a base layer for preserving the shape of the module;
   an electrical power layer having a power supply section for supplying electrical power installed therein;
   a covering layer for externally covering the electrical power layer; and
   engaging means for engagement with an appropriate portion of the robot.

29. An external module for a robot according to claim 28, wherein the electrical power layer is a removable battery pack, and wherein the base layer includes a terminal for electrical coupling with the battery pack.

30. An external module for a robot according to claim 28, wherein the electrical power layer comprises a secondary battery which is chargeable and reusable.

* * * * *